(12) United States Patent
Moon et al.

(10) Patent No.: US 9,720,624 B2
(45) Date of Patent: Aug. 1, 2017

(54) METHOD OF CONTROLLING A MEMORY SYSTEM

(71) Applicants: Sang-kwon Moon, Pyeongtaek-si (KR);
Kyung-ryun Kim, Seoul (KR);
Dong-sub Kim, Yongin-si (KR);
Kyung-ho Kim, Seoul (KR)

(72) Inventors: Sang-kwon Moon, Pyeongtaek-si (KR);
Kyung-ryun Kim, Seoul (KR);
Dong-sub Kim, Yongin-si (KR);
Kyung-ho Kim, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 262 days.

(21) Appl. No.: 14/602,990

(22) Filed: Jan. 22, 2015

(65) Prior Publication Data
US 2015/0220276 A1 Aug. 6, 2015

(30) Foreign Application Priority Data
Feb. 5, 2014 (KR) ........................ 10-2014-0013322

(51) Int. Cl.
*G06F 3/06* (2006.01)
*G06F 12/02* (2006.01)

(52) U.S. Cl.
CPC ............ *G06F 3/0659* (2013.01); *G06F 3/061* (2013.01); *G06F 3/0638* (2013.01); *G06F 3/0688* (2013.01); *G06F 12/0246* (2013.01); *G06F 2212/1024* (2013.01); *G06F 2212/7201* (2013.01)

(58) Field of Classification Search
CPC ............ G06F 12/0238; G06F 12/0246; G06F 3/0659; G06F 3/061; G06F 3/0638; G06F 3/0688; G06F 2212/1024; G06F 2212/7201
See application file for complete search history.

(56) References Cited

U.S. PATENT DOCUMENTS 7,177,977 B2 2/2007 Chen et al.
7,409,493 B2 8/2008 Roohparvar et al.
7,457,169 B2 11/2008 Roohparvar
(Continued)

FOREIGN PATENT DOCUMENTS

WO WO-175896 A2 10/2001
WO WO-2013145024 A1 10/2013

*Primary Examiner* — David X Yi
*Assistant Examiner* — Ramon A Mercado
(74) *Attorney, Agent, or Firm* — Harness, Dickey & Pierce, P.L.C.

(57) ABSTRACT

According to example embodiments, a method of controller a memory system using a controller includes receiving a first read count command, determining if a read count of a non-volatile memory in the memory system exceeds a threshold value, and performing a first reading operation on the non-volatile memory according to the first read command. If the read count of the non-volatile memory exceeds the threshold value, then addresses are selected to which a plurality of additive reading operation corresponding to the first read command will be performed, in a random neighbor selection operation. The plurality of additive reading operations for checking data of neighboring pages of the page for performing the reading operation are distributed and processed.

20 Claims, 14 Drawing Sheets

(56) References Cited

U.S. PATENT DOCUMENTS

| | | | |
|---|---|---|---|
| 7,679,133 B2 | 3/2010 | Son et al. | |
| 7,716,415 B2 | 5/2010 | Sharon | |
| 7,818,525 B1* | 10/2010 | Frost | G06F 12/0246 365/185.25 |
| 7,876,620 B2 | 1/2011 | Mokhlesi et al. | |
| 8,316,278 B2* | 11/2012 | Ahn | G06F 11/1068 365/185.09 |
| 8,381,018 B2 | 2/2013 | Lee et al. | |
| 8,438,453 B2 | 5/2013 | Post et al. | |
| 8,472,266 B2 | 6/2013 | Khandelwal et al. | |
| 8,553,466 B2 | 10/2013 | Han et al. | |
| 8,559,235 B2 | 10/2013 | Yoon et al. | |
| 8,654,587 B2 | 2/2014 | Yoon et al. | |
| 8,725,936 B2 | 5/2014 | Oikawa et al. | |
| 8,874,835 B1* | 10/2014 | Davis | G06F 3/0679 711/103 |
| 9,257,169 B2* | 2/2016 | Jung | G11C 11/40622 |
| 9,570,198 B2* | 2/2017 | Bellorado | G11C 11/5642 |
| 2008/0288814 A1* | 11/2008 | Kitahara | G06F 11/073 714/5.1 |
| 2009/0172267 A1* | 7/2009 | Oribe | G11C 16/3418 711/103 |
| 2011/0055468 A1 | 3/2011 | Gonzalez et al. | |
| 2011/0072189 A1 | 3/2011 | Post et al. | |
| 2011/0233648 A1 | 9/2011 | Seol et al. | |
| 2012/0030506 A1* | 2/2012 | Post | G06F 11/008 714/6.1 |
| 2012/0060066 A1* | 3/2012 | Nagadomi | G06F 11/1068 714/704 |
| 2012/0239991 A1 | 9/2012 | Melik-Martirosian | |
| 2013/0201760 A1 | 8/2013 | Dong et al. | |
| 2014/0016397 A1* | 1/2014 | Lee | G11C 13/0069 365/148 |
| 2014/0258769 A1* | 9/2014 | Baryudin | G06F 12/02 714/2 |
| 2015/0067415 A1* | 3/2015 | Miyamoto | G06F 11/073 714/704 |
| 2015/0332788 A1* | 11/2015 | Bellorado | G11C 11/5642 714/719 |

* cited by examiner

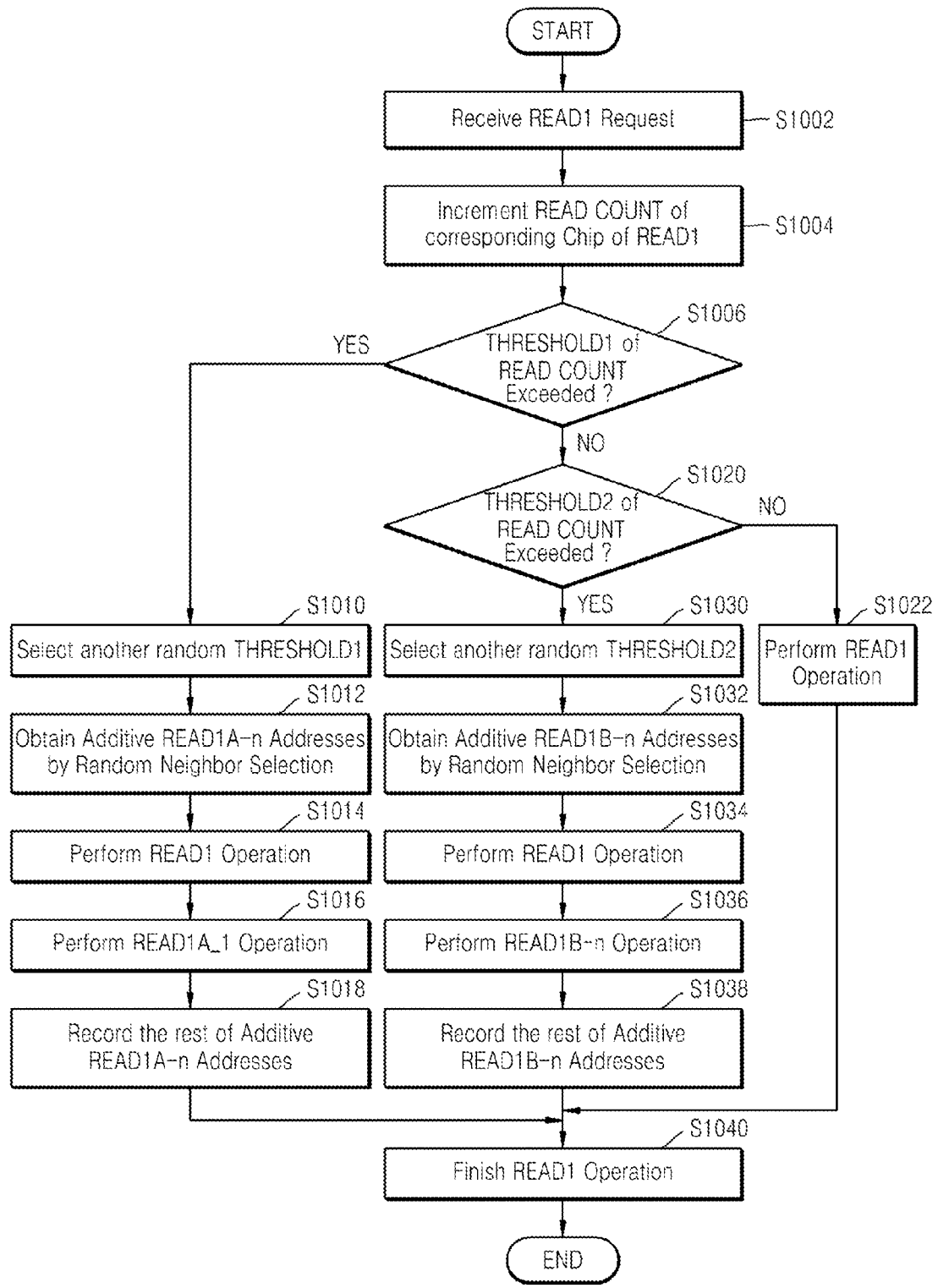

METHOD OF CONTROLLING A MEMORY SYSTEM

CROSS-REFERENCE TO RELATED APPLICATIONS

This application claims priority under 35 U.S.C. §119 to Korean Patent Application No. 10-2014-0013322, filed on Feb. 5, 2014, in the Korean Intellectual Property Office, the disclosure of which is incorporated herein in its entirety by reference.

BACKGROUND

The present disclosure relates to a method of controlling a memory, and more particularly, to a method of controlling a memory in communication with a random neighbor selection operation, in order to reduce a read latency overhead according to a reading operation of a non-volatile memory.

A NAND-type flash memory may have data errors caused by a reading operation and the data errors may be referred to as a read disturb. In order to reduce (and/or prevent) the data errors, a read disturb check may be performed. The read disturb check refers to performing sequential reading operations neighboring pages of a selected page after performing a reading operation on the selected page that is selected by a reading command. Due to the sequential reading operations for performing the read disturb check, a read time of flash memories may be exceeded. Accordingly, a read latency overhead may occur.

SUMMARY

Example embodiments of inventive concepts relate to a method of controlling a memory in connection with a random neighbor selection operation. In example embodiments, a read latency overhead caused by a reading operation of a non-volatile memory may be reduced.

According to example embodiments, a method of controlling a memory system using a controller includes: receiving a first read command; determining if a read count of a non-volatile memory in the memory system exceeds a threshold value; if the read count of the non-volatile memory exceeds the threshold value, selecting addresses to which a plurality of additive reading operations corresponding to the first read command will be performed, in a random neighbor selection operation; performing a first reading operation on the non-volatile memory according to the first read command; and distributing the plurality of additive reading operations to check data of neighboring pages of a page on which the first reading operation has been performed.

In example embodiments, the distributing of the plurality of additive reading operations may include: performing a one of the plurality of additive reading operations after the first reading operation; and storing addresses for remaining ones of the plurality of additive reading operations, except for the one of the plurality of additive reading operations that has been performed, using the controller.

In example embodiments, the method may further include determining the number of desired (and/or alternatively) predetermined additive reading operations by monitoring a remaining time after performing the first reading operation, during a reading time granted to the first read command.

In example embodiments, the method may further include, if the read count of the non-volatile memory exceeds the threshold value, changing the threshold value.

In example embodiments, the method may further include: receiving a second read command; determining whether the additive reading operations according to the first read command are associated with a chip in the non-volatile memory that is different than a chip in the non-volatile memory associated with the second read command; and simultaneously performing the additive reading operations according to the first read command and a second reading operation according to the second read command if the additive reading operations according to the first read command and the second read command are associated with different chips in the non-volatile memory.

In example embodiments, the method may further include: converting addresses of the plurality of additive reading operations corresponding to the first read command into logical addresses by using a flash translation layer (FTL); determining whether the logical addresses that are converted by the FTL are valid; and if the logical addresses are not valid, selecting other addresses of the additive reading operations corresponding to the first read command in the random neighbor selection operation.

In example embodiments, the distributed additive reading operations may be performed during an idle time of the controller.

In example embodiments, the addresses of the plurality of additive reading operations corresponding to the first read command, which are selected in the random neighbor selection operation, may be included in one of a self block and an adjacent neighboring block of the non-volatile memory, and an address of a memory cell read during the first read command may be in the self block.

In example embodiments, the threshold value of the read count may be set differently according to whether the plurality of additive reading operations corresponding to the first read command are in the self block or the adjacent neighboring block.

In example embodiments, the method may further include checking states of a string selection transistor and a ground selection transistor in the one of the self-block and the adjacent neighboring block of the non-volatile memory on which the plurality of additive reading operations corresponding to the first read command are performed.

In example embodiments, the method may further include checking data of pages on which the plurality of additive reading operations according to the first read command are performed. A period of the checking states of the string selection transistor and the ground selection transistor may be different than a period of the checking the data of pages on which the plurality of additive reading operations according to the first read command are performed.

According to example embodiments, a method of controlling a memory system using a controller includes: receiving a read command; determining if a read count of a non-volatile memory in the memory system exceeds a threshold value; if the read count of the non-volatile memory exceeds the threshold value, selecting addresses to which a plurality of additive reading operations corresponding to the read command in a random neighbor selection operation for checking data of a neighboring page of a page on which a reading operation according to the read command would be performed; transmitting the addresses for performing the plurality of additive reading operations corresponding to the read command to a host; performing the reading operation according to the read command; and performing the plurality of additive reading operations as user reading operations by the host.

In example embodiments, the method may further include changing the threshold value if the read of the non-volatile memory for performing the read command exceeds the threshold value.

In example embodiments, the method may further include converting addresses of the plurality of additive reading operations corresponding to the read command into logical addresses by using a flash translation layer (FTL); determining whether the logical addresses that are converted by the FTL are valid; and if the logical addresses are not valid, selecting other addresses of the additive reading operations corresponding to the read command in the random neighbor selection operation.

In example embodiments, the method may further include checking states of a string selection transistor and a ground selection transistor in a block on which the plurality of additive reading operations corresponding to the read command are performed.

According to example embodiments, a method of controlling a memory system using a controller includes: receiving a first read command; determining an address of a selected memory cell associated with the first read command, the selected memory cell being in a selected page among a plurality of pages in a non-volatile memory of the memory system, each page including a plurality of memory cells; and determining whether a record exists that indicates one or more previous additive reading operations have been recorded and have not been performed yet, the previous additive reading operations corresponding to addresses of pages that neighbor a page associated with a previous read operation performed among the plurality of pages; performing a first reading operation on the selected page according to the first read command; distributing remaining ones of the previous additive reading operations, if the record exists, by performing at least one of the remaining ones of the previous additive reading operations before the first reading operation is finished in order to check data of one of the pages that neighbor the page associated with the previous read operation; determining whether a read count of the non-volatile memory exceeds a threshold value, if the record does not exist, before the performing the first reading operation; and generating and distributing additive reading operations associated with the first reading operation, if the record does not exist and if the read count exceeds the threshold value, by performing a random neighbor generation operation to generate addresses for the additive reading operations associated with the first reading operation to check data on pages that neighbor the selected page among the plurality of pages, checking data on one of the pages that neighbors the selected page by performing one of the additive reading operations associated with the first reading operation before the first reading operation is finished, and checking data on at least one other page that neighbors the selected page associated with the first reading operation by performing at least one other one of the additive reading operations associated with the first reading operation after the first reading operation is finished.

In example embodiments, the generating and distributing additive reading operations associated with the first reading operation may further include storing the additive reading operations associated with the first reading operation, except for the one of the additive reading operations associated with the first reading operation that is performed before the reading operation is finished, in firmware after the checking data on the one of the pages that neighbors the selected page.

In example embodiments, the method may further include changing the threshold value if the record does not exist and the determining whether the read count of the non-volatile memory exceeds the threshold value indicates the read count exceeds the threshold value.

In example embodiments, the method may further include incrementing the read count of the non-volatile memory after the receiving the first read command and before the first reading operation is finished.

In example embodiments, the non-volatile memory may include a plurality of strings extending vertically on a substrate. Each one of the plurality of string may include a number of the plurality of memory cells stacked on top of each other being a ground between a ground select transistor and a string select transistor.

BRIEF DESCRIPTION OF THE DRAWINGS

The foregoing and other features of inventive concepts will be apparent from the more particular description of non-limiting embodiments of inventive concepts, as illustrated in the accompanying drawings in which like reference characters refer to like parts throughout the different views. The drawings are not necessarily to scale, emphasis instead being placed upon illustrating principles of inventive concepts. In the drawings:

FIG. 10 is flowchart of a method of controlling a flash memory, according to example embodiments;

DETAILED DESCRIPTION

Figure 1:
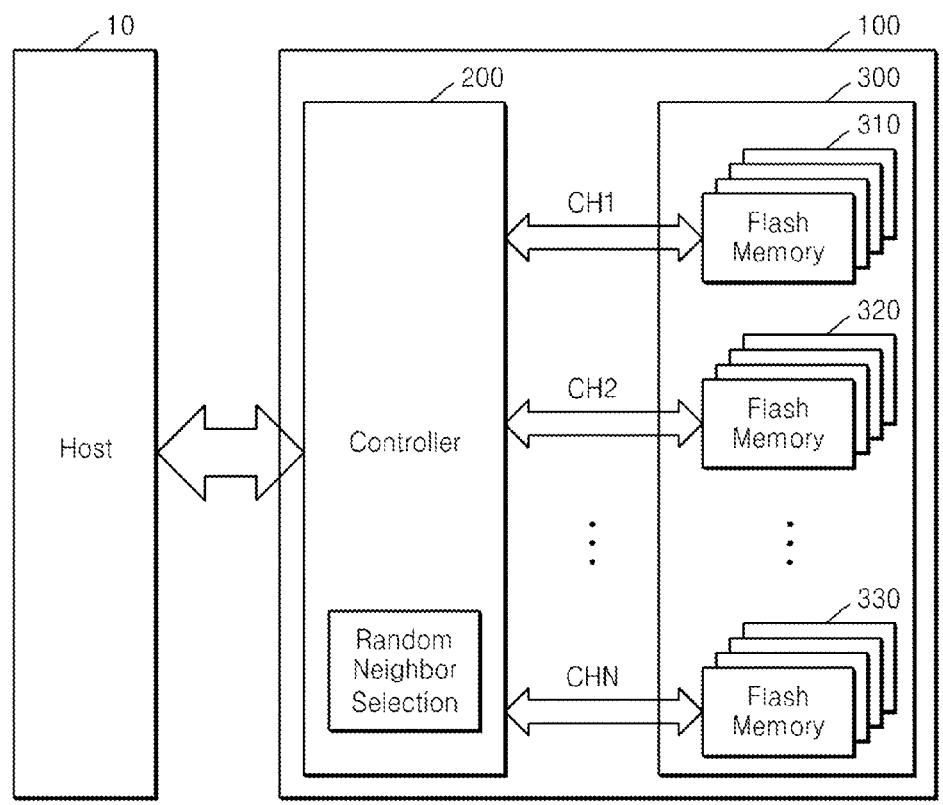
FIG. 1 is a block diagram of a memory system using a method of controlling a flash memory according to example embodiments.

Example embodiments of inventive concepts will now be described more fully with reference to the accompanying drawings, in which some example embodiments are shown. Example embodiments of inventive concepts, may, however, be embodied in many different forms and should not be construed as being limited to the embodiments set forth herein; rather, these example embodiments are provided so that this disclosure will be thorough and complete, and will fully convey the scope of example embodiments of inventive concepts to those of ordinary skill in the art. In the drawings, the thicknesses of layers and regions are exaggerated for clarity. Like reference characters and/or numerals in the drawings denote like elements, and thus their description may be omitted.

However, this is not intended to limit inventive concepts to particular modes of practice, and it is to be appreciated that all changes, equivalents, and substitutes that do not depart from the spirit and technical scope of inventive concepts are encompassed in the claims. In the description that follows, certain detailed explanations of related art may be omitted when it is deemed that they may unnecessarily obscure the discussion of example embodiments of inventive concepts.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on"). As used herein the term "and/or" includes any and all combinations of one or more of the associated listed items.

It will be understood that, although the terms "first", "second", etc. may be used herein to describe various elements, components, regions, layers and/or sections. These elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof. Expressions such as "at least one of," when preceding a list of elements, modify the entire list of elements and do not modify the individual elements of the list.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. As used herein, the term "and/or" includes any and all combinations of one or more of the associated listed items. Expressions such as "at least one of," when preceding a list of elements, modify the entire list of elements and do not modify the individual elements of the list.

Semiconductor memory devices may be classified as volatile memory devices such as dynamic random access memory (DRAM) and static random access memory (SRAM), and non-volatile memory devices such as electronically erasable programmable ROM (EEPROM), ferroelectric random access memory (FRAM), parameter random access memory (PRAM), magnetoresistive random access memory (MRAM), a flash memory, etc. A volatile memory device loses data stored therein when electric power is blocked; however, a non-volatile memory device may maintain data stored therein even if electric power is blocked. In particular, a flash memory has advantages such as high programming speeds, low power consumption, and large capacity data storage, and thus, is widely used as a storage medium in various computer systems.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device.

The plurality of device structures may be arranged in an array and/or in a two-dimensional pattern.

FIG. 1 is a block diagram of a memory system 100 adopting a method of controlling a flash memory according to example embodiments.

Referring to FIG. 1, the memory system 100 includes a controller 200 and a data storage unit 300. The data storage unit 300 may include non-volatile memories such as flash memories 310, 320, 330, but example embodiments are not limited thereto. The controller 200 may control the data storage unit 300.

Figure 2:
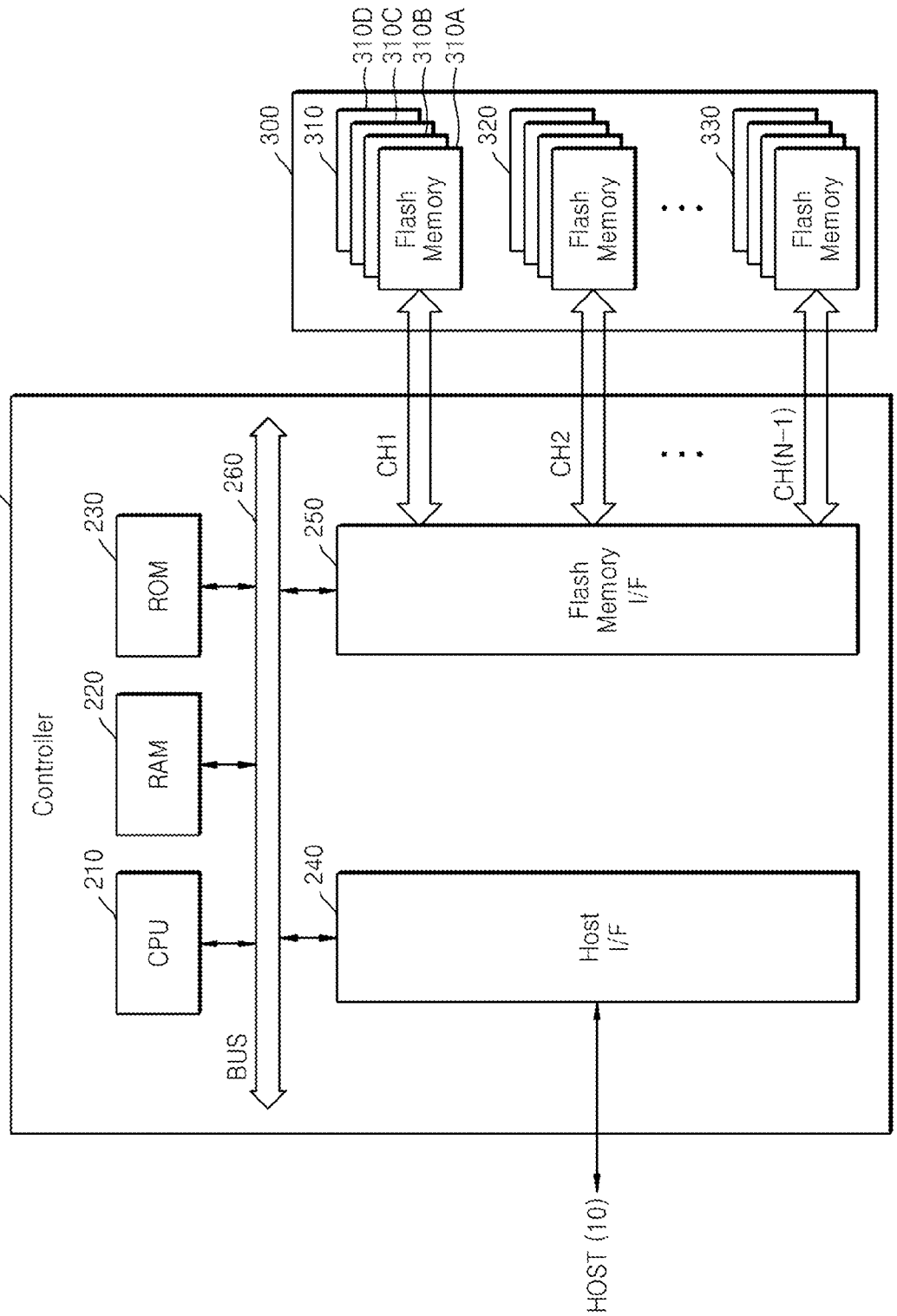
FIG. 2 is a diagram of a detailed configuration of a controller shown in FIG. 1.

One or more channels, for example, N channels CH1 through CHN, may be disposed between the controller 200 and the data storage unit 300. The flash memories 310-330 may be electrically connected to the controller 200 through each of the channels CH1 through CHN, respectively. In addition, each of the flash memories 310-330 connected to each of the channels CH1 through CHN may be configured in a plurality of ways. For example, as shown in FIG. 2, the flash memory 310 connected to the channel CH1 may include a plurality of ways 310A through 310D.

Each of the channels CH1 through CHN denotes an independent bus for transmitting commands and data to its corresponding flash memory of the flash memories 310-330 The flash memories 310-330 connected to different channels, respectively, may operate independently from each other. Ways denote a set of flash memories sharing one channel with each other. Each flash memory chip may be identified according to a channel and a way corresponding to the flash memory. Through a logical address transmitted from a host 10, it may be determined in which flash memory chip of a channel and a way the command transmitted from the host 10 will be performed.

An example where the data storage unit 300 includes flash memories will be described, but example embodiments are not limited thereto. The data storage unit 300 may alternatively include different types of memory than flash memory.

The number of data bits stored in each memory cell in each of the flash memories 310-330 may be variously modified. For example, each of the flash memories 310-330 may include single-bit cells or single-level cells (SLCs) storing one-bit data in one memory cell, or multi-bit cells, multi-level cells (MLCs), or multi-state cells storing multi-bit data (for example, two or more bits) in one memory cell. The MLCs are advantageous in highly integrating a memory. In each of the flash memories 310-330, a charge storage layer of a memory cell may be configured in various forms. For example, the charge storage layer of the memory cell may be formed of polycrystalline silicon having conductivity, or may be formed of an insulating layer such as $Si_3N_4$, $Al_2O_3$, HfAlO, HfSiO, etc.

The controller 200 may exchange data with the host 10 via one of various interfaces such as universal serial bus (USB), multimedia card (MMC), peripheral component interconnect express (PCI-E), advanced technology attachment (ATA), parallel ATA (PATA), serial attached small computer system interface (SAS), small computer system interface (SCSI), embedded multimedia card (eMMC), or enhanced small disk interface (ESDI). The interface between the controller 200 and the host 10 may be performed by a host interface (240 of FIG. 2) included in the controller 200.

The controller 200 is configured to control writing, erasing, and reading operations of the flash memories 310-330 in response to a command received from the host 10. The command may be input from the host 10.

The controller 200 may perform a random neighbor selection operation for performing a read disturb check according to reading operations of the flash memories 310-330. The random neighbor selection operation may be used when the number of readings of the flash memories 310-330 with respect to which a read command will be executed exceeds a desired (and/or alternatively predetermined) critical value in order to check data of a page neighboring a page on which the reading operation has been performed. According to the random neighbor selection operation, addresses to which a plurality of additive reading operations corresponding to a read command will be performed may be selected. The plurality of additive reading operations may be performed after being dispersed.

The controller 200 may perform one of the plurality of additive reading operations after performing a reading operation according to a read command and store addresses to which the remaining additive reading operations will be performed so as to perform the remaining additive reading operations in another reading operation according to another read command. The controller 200 may transmit to the host 10 the addresses, to which the plurality of additive reading operations will be performed, selected according to the random neighbor selection operation. The plurality of additive reading operations transmitted to the host 10 may be performed as user reading operations.

FIG. 2 is a block diagram showing a detailed configuration of the controller 200 shown in FIG. 1.

Referring to FIG. 2, the controller 200 may include a processor 210, RAM 220, ROM 230, a host interface 240, a flash memory interface 250, and a bus 260. The processor 210, the RAM 220, the ROM 230, the host interface 240, and the flash memory interface 250 are electrically connected to each other via the bus 260. The bus 260 is a transmission path through which information is transmitted between components of the controller 200. The processor 210 controls overall operations of a memory system, for example, the memory system 100 of FIG. 1. In particular, the processor 210 analyzes commands transmitted from the host 10 and controls the memory system 100 to perform operations according to the analysis result. In example embodiments, the processor 210 may be a hardware processor such as central processing unit (CPU), a multi-processor, a distributed processing system, an application specific integrated circuit (ASIC), and/or a suitable hardware processing unit.

The processor 210 provides the flash memories 310-330 with the read command and address during the reading operation and provides the flash memories 310-330 with a write command, an address, and write data during a writing operation. In addition, the processor 210 converts a logical address transmitted from the host 10 into a physical page address (PPA) by using metadata stored in the RAM 220.

The processor 210 may perform a memory control method for checking a read disturb according to the reading operations in the flash memories 310-330 in connection with the random neighbor selection operation. The random neighbor selection operation may select addresses to which a plurality of additive reading operations corresponding to a first read command in order to check neighboring page data of the page on which a first reading operation is performed. In a case where the number of readings of the memory chip with respect to which the first read command will be executed exceeds a desired (and/or alternatively predetermined) critical value, the processor 210 may change the critical value of the number of reading operations in the memory chip with respect to which the first read command is executed.

The processor 210 may determine whether the memory chip with respect to which the first read command has been executed and a memory chip with respect to which a second read command will be executed differ. As a result of the determination, if the two memory chips differ, a second reading operation according to the second read command is performed, and then, the additive reading operations according to the first read command may be performed. As a result of the determination, if the two memory chips are the same as each other, additive reading operations according to the second read command may be performed after performing a reading operation according to the second read command.

The processor 210 may convert a logical address transmitted from the host 10 with the read/write command into a physical address (e.g, physical page address PPA) for performing reading/writing operations on the flash memories 310-330. The conversion from a logical address into a physical address may be performed by a flash translation layer (FTL). The FTL in the processor 210 may convert addresses of the plurality of additive reading operations corresponding to the read command into logical addresses and may determine whether the logical addresses are effective. As a result of the determination, if the converted logical addresses are invalid, the processor 210 may select addresses of other additive reading operations corresponding to the read command in the random neighbor selection operation.

The processor 210 may distribute the plurality of additive reading operations corresponding to the read command and then, may execute the additive reading operations in an idle time of the controller 200. The processor 210 may set the addresses of the plurality of additive reading operations corresponding to the read command, which are selected in the random neighbor selection operation, to be included in a block that is the same as the block on which the read command is performed or in an adjacent block to the block on which the read command is performed. The processor 210 may set the critical value of the number of reading operations to vary depending on the self block or the adjacent block.

The processor 210 may check states of a string selection transistor and a ground selection transistor of the block on which the plurality of additive reading operations corresponding to the read command are performed. The processor 210 may set a period of checking the states of the string selection transistor and the ground selection transistor to be different from a period of checking data of the page on which the plurality of additive reading operations according to the first read command are performed.

The RAM 220 may temporarily store data transmitted from the host 10 and data generated by the processor 210, or temporarily store data read from the flash memories 310-330. Also, the RAM 220 may store metadata read from the flash memories 310-330. The metadata is management information generated by the memory system 100 in order to manage the flash memories 310-330. The metadata includes mapping table information that is used to convert a logical address into a PPA of the flash memories 310-330. The metadata may include information for managing storage spaces of the flash memories 310-330. The RAM 220 may be embodied as a volatile memory device, such as DRAM or SRAM.

The ROM 230 stores programs executed by the processor 210. The ROM 230 may store a program for performing a memory control method in connection with the random neighbor selection operation for checking for a read disturb according to the reading operations of the flash memories 310-330.

The host interface 240 includes a data exchange protocol between the host 10 and the processor 210. Various devices may be connected to the host interface 240 as hosts 10. The host 10 may be, for example, a digital image recording apparatus or a digital voice recording apparatus.

The flash memory interface 250 controls signals that drive the flash memories 310-330 and may access the flash memories 310-330 according to a request from the processor 210. The flash memory interface 250 may be configured so that software and hardware interleaving operations may be selectively performed via the plurality of channels CH1 through CHN.

When electric power is applied to the memory system 100, the processor 210 controls the memory system 100 to read metadata stored in the flash memories 310-330 and store the metadata in the RAM 220. The processor 210 controls the memory system 100 to update the metadata stored in the RAM 220 according to an operation causing metadata change in the flash memories 310-330. In addition, the processor 210 controls the memory system 100 to write the metadata stored in the RAM 220 in the flash memories 310-330 before turning the power of the memory system 100 off.

According to example embodiments, processes executed by the controller 200 allow the processor 210 to run a program stored in the RAM 220 or the ROM 230 and access the flash memories 310-330.

Figure 3:
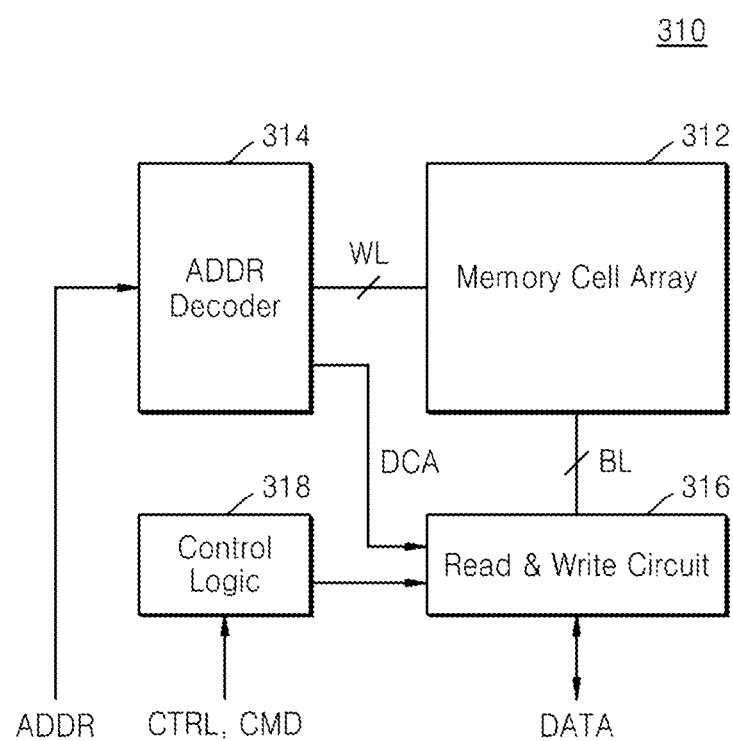
FIG. 3 is a diagram of a detailed configuration of a flash memory shown in FIG. 1.

FIG. 3 is a diagram of a detailed configuration of a flash memory 310 shown in FIG. 1.

Referring to FIG. 3, the flash memory 310 may be a NAND-type flash memory. The flash memory 310 may include a memory cell array 312, an address decoder 314, a read and write circuit 316, and a control logic 318.

The memory cell array 312 is connected to the address decoder 314 via word lines WLs and is connected to the read and write circuit 316 via bit lines BLs. The memory cell array 312 includes a plurality of memory cells. For example, memory cells arranged in a row direction are connected to the word lines WLs, and memory cells arranged in a column direction are connected to the bit lines BLs. The memory cells arranged in the column direction may be configured as a plurality of cell groups (for example, strings), and the strings may be respectively connected to the bit lines BLs. For example, the memory cell array 312 may include a plurality of memory cells that each store one or more bits.

The memory cell array 312 may store general user data or main data and may store metadata (for example, mapping information of the FTL) that is necessary for driving the flash memory 310 in addition to the user data. The FTL allows the flash memory 310 to be used effectively. The FTL converts a logical address provided by the processor 210 of FIG. 2 into a physical address (e.g., PPA) that may be used in the flash memory 310.

The memory cell array 312 may store addresses to which the plurality of additive reading operations will be performed for checking neighboring page data of the page on which the reading operation is performed, in order to check for a read disturb according to the reading operation of the flash memory 310.

The address decoder 314 is configured to decode a row address from among addresses ADDR. The address decoder 314 selects the word lines WLs by using the decoded row address. The address decoder 314 may be configured to decode a column address from among the addresses ADDR.

A decoded column address DCA is transferred to the read and write circuit 316. For example, the address decoder 314 may include elements such as a row decoder, a column decoder, an address buffer, etc.

The read and write circuit 316 receives data from a data input/output circuit and writes the data in the memory cell array 312. The read and write circuit 316 reads data from the memory cell array 312 and transmits the read data to the data input/output circuit. For example, the read and write circuit 316 may include elements such as a page buffer (or a page register), a column selection circuit, a data buffer, etc. The page buffer may operate as a write driver for temporarily storing data that will be written in the memory cells that are connected to the selected word line, or may operate as a sensing amplifier that senses and amplifies the data read from the memory cells that are connected to the selected word line.

The control logic 318 may control overall operations that are related to the programming operation, the reading operation, and the erasing operation of the flash memory 310.

The control logic 318 may control the plurality of additive reading operations for checking neighboring page data of the page on which the reading operation is performed, in order to check for a read disturb caused by the reading operation. The control logic 318 may perform the plurality of additive reading operations on the self block that is the same as that on which the read command is performed or an adjacent neighboring block. The control logic 318 may perform a reading operation for checking states of the string selection transistor and the ground selection transistor on the block on which the plurality of additive reading operations are performed.

Figure 4A:
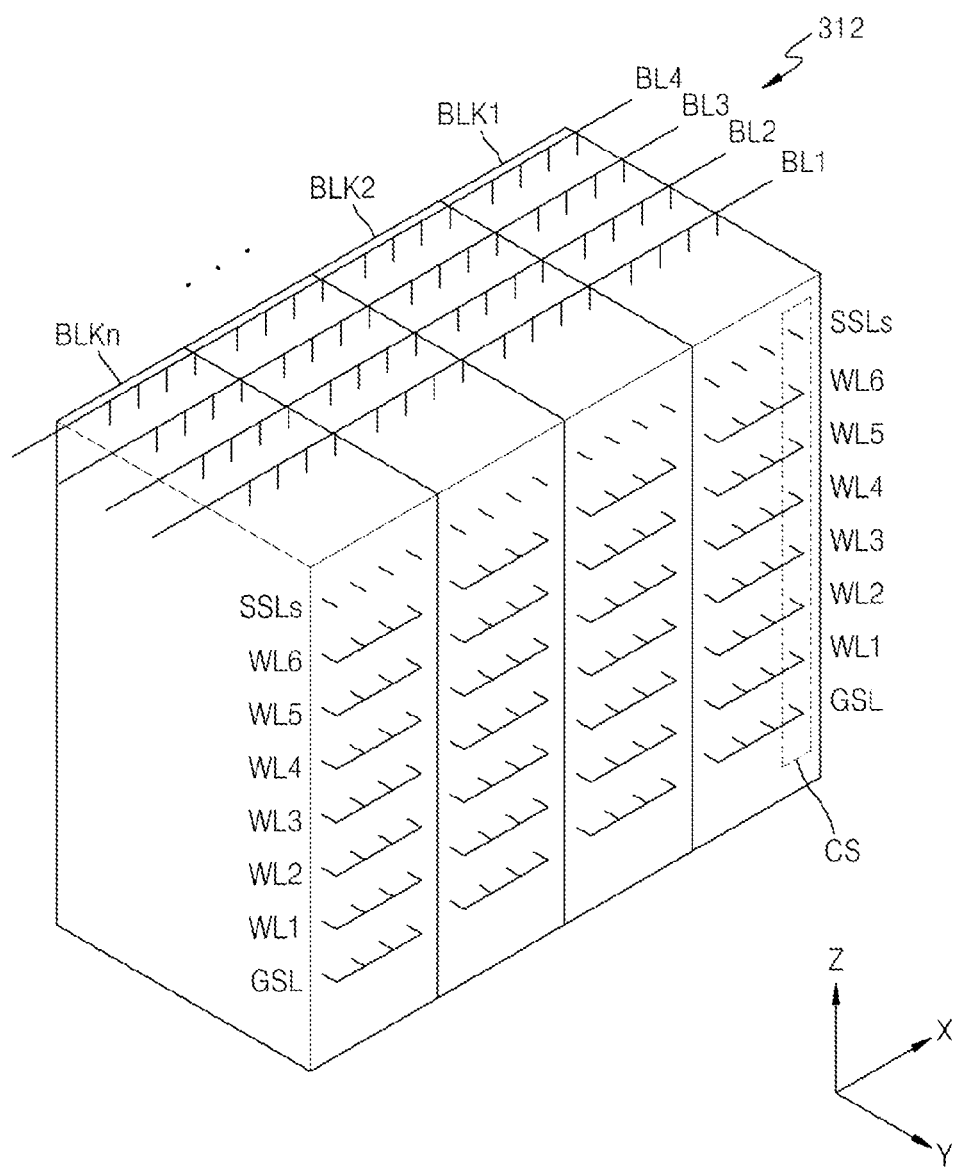
FIGS. 4A through 4C are diagrams of a memory cell array shown in FIG. 3.
Figure 4B:
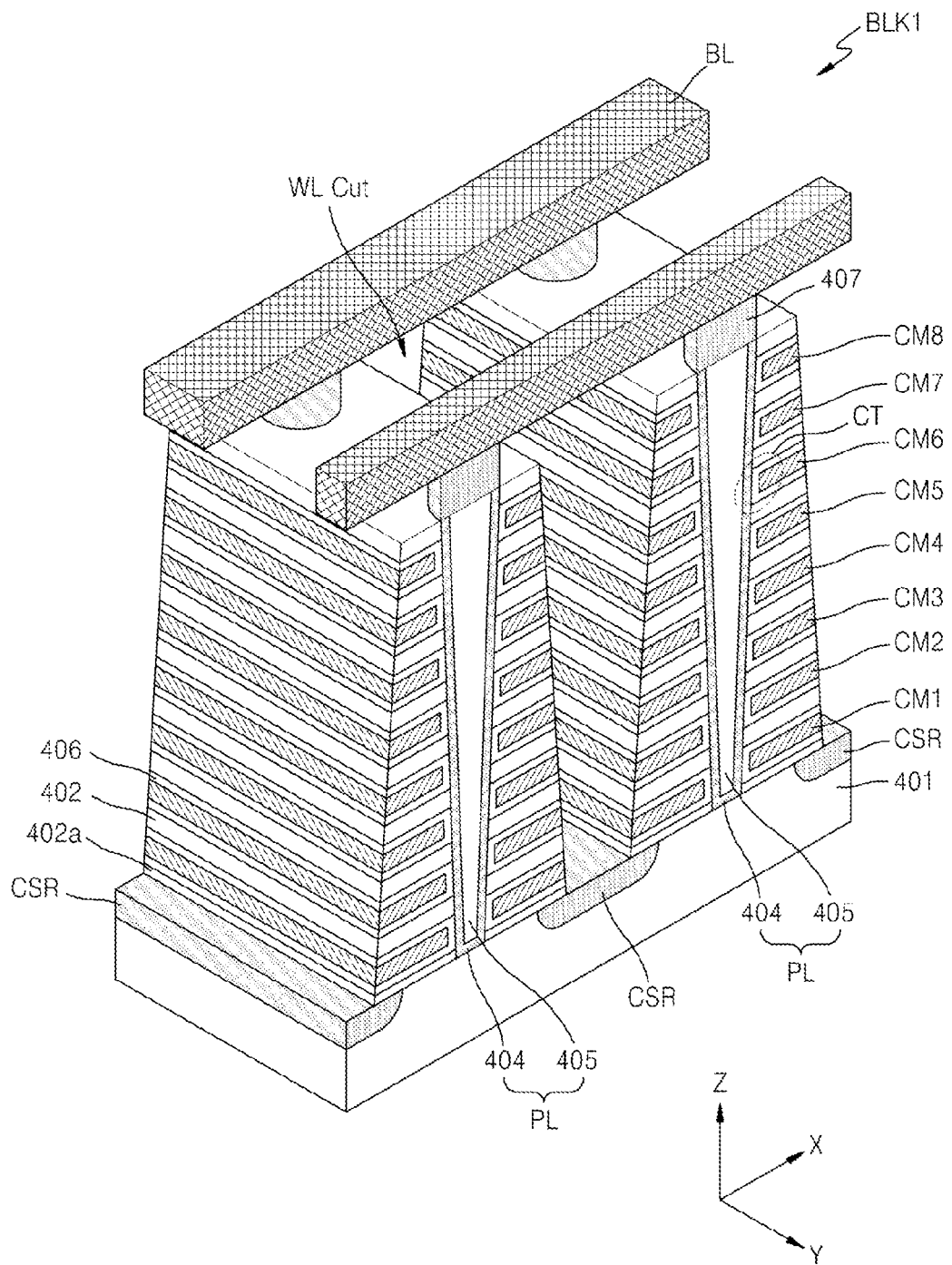
Figure 4C:
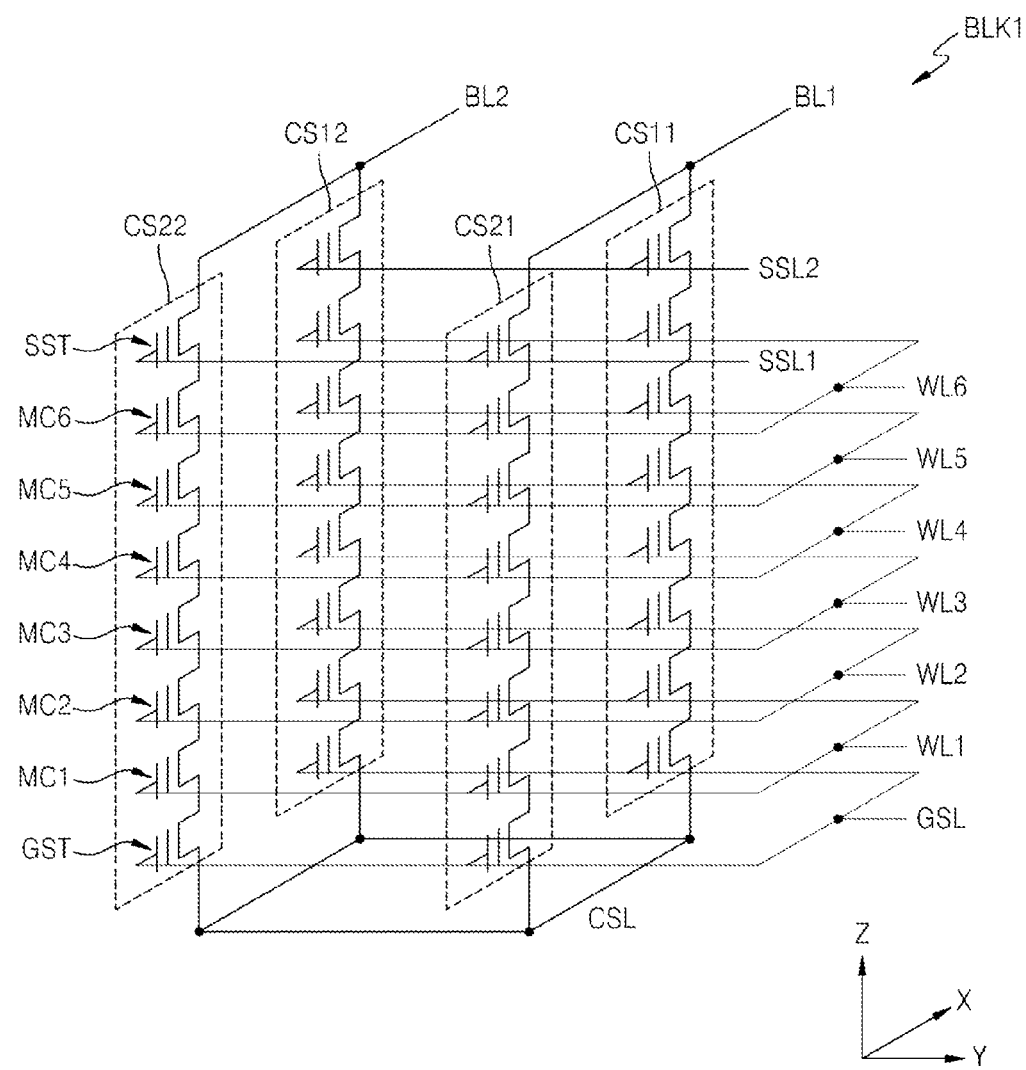

FIGS. 4A through 4C are diagrams illustrating the memory cell array 312 of FIG. 3.

In example embodiments, a nonvolatile memory may be embodied to include a three dimensional (3D) memory array. The 3D memory array may be monolithically formed on a substrate (e.g., semiconductor substrate such as silicon, or semiconductor-on-insulator substrate). The 3D memory array may include two or more physical levels of arrays of memory cells having an active area disposed above the substrate and circuitry associated with the operation of those memory cells, whether such associated circuitry is above or within such substrate. The layers of each level of the array may be directly deposited on the layers of each underlying level of the array.

In example embodiments, the 3D memory array may include vertical NAND strings that are vertically oriented such that at least one memory cell is located over another memory cell. The at least one memory cell may comprise a charge trap layer.

The following patent documents, which are hereby incorporated by reference in their entirety, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

Referring to FIG. 4A, the memory cell array 312 includes a plurality of memory blocks, namely, first to n blocks BLK1-BLKn. Each of the first to n blocks BLK1-BLKn has a three-dimensional (3D) structure (or a vertical structure). For example, each of the first to n blocks BLK1-BLKn may include structures extending in first through third directions. Each of the first to n blocks BLK1-BLKn may include a plurality of cell strings CSs extending in the third direction (Z). The plurality of cell strings CSs may be separate from each other in the first direction (X) and the second direction (Y).

FIG. 4B is a perspective view of a part of a first memory block BLK1.

Referring to FIG. 4B, a 3D structure extending in the first through third directions X, Y, and Z is provided. In addition, a substrate 401 is provided. For example, the substrate 401 may be a well of a first conductivity type. The substrate 401 may be a well of a P-conductivity type. A plurality of common source regions CSR that extend in the second direction Y and are separate from each other in the first direction X are provided in the substrate 401. The plurality of common source regions CSR may be commonly connected to each other to configure common source lines CSL. The plurality of common source regions CSR are of a second conductivity type that is different from that of the substrate 401. For example, the plurality of common source regions CSR may be of an N-conductivity type.

Between every two adjacent common source regions CSR from among the plurality of common source regions CSR, a plurality of insulating materials 402a and 402 are sequentially provided on the substrate 401 in the third direction Z that is perpendicular to the substrate 401. The plurality of insulating materials 402a and 402 are separate from each other in the third direction Z and extend along the second direction Y. The plurality of insulating materials 402a and 402 may include an insulating material such as a semiconductor oxide layer (e.g., silicon oxide). The insulating material 402a contacting the substrate 401 may have a thickness that is greater than that of the other insulating material 402.

Between every two adjacent common source regions CSR, a plurality of pillars PL that are separate from each other in the first direction X and penetrate through the plurality of insulating materials 402a and 402 in the third direction Z are provided. The plurality of pillars PL may contact the substrate 401 after penetrating through the insulating materials 402a and 402. The plurality of pillars PL may include channel films 404 and internal materials 405 in the channel films 404. The channel films 404 may include a semiconductor material (for example, silicon) of the first conductivity type that is the same as that of the substrate 401. The internal materials 405 may include an insulating material such as a silicon oxide layer.

Between the two adjacent common source regions CSR, information storing layers 406 are provided on exposed surfaces of the insulating materials 402a and 402 and the pillars PL. The information storing layers 406 may capture or release charges for storing information. The information storage layers 406 may be multilayer structure that include a first silicon oxide layer, a silicon nitride layer, and a second silicon oxide layer (e.g., oxide-nitride-oxide), but example embodiments are not limited thereto.

Between two adjacent common source regions CSR and between the insulating materials 402a and 402, conductive materials CM1 through CM8 are provided onto exposed surfaces of the information storing layers 406. The conductive materials CM1 through CM8 may extend in the second direction Y. The conductive materials CM1 through CM8 may be divided by a word line cut WL_cut with respect to the common source regions CSR. The word line cut WL_cut may extend in the second direction Y and may expose the common source regions CSR. The conductive materials CM1 through CM8 may include a metallic conductive material. The conductive materials CM1 through CM8 may include a non-metallic conductive material such as polysilicon. The conductive materials CM1 through CM8 may have first through eighth heights according to an order from the substrate 401.

A plurality of drains 407 are provided on the plurality of pillars PL. The plurality of drains 407 may include a semiconductor material (for example, silicon) of the second conductivity type. The drains 407 may extend on upper portions of the channel films 404 of the pillars PL. Bit lines BLs extend on the drains 407 in the first direction X and are separate from each other in the second direction Y. The bit lines BL are connected to the drains 407. For example, the drains 407 and the bit lines BLs may be connected to each other via contact plugs. The bit lines BL may include a metallic conductive material. The bit lines BL may include a non-metallic conductive material such as polysilicon.

The plurality of pillars PL form a plurality of cell strings with the information storing layers 406 and the plurality of conductive materials CM1 through CM8. Each of the cell strings configures a plurality of cell transistors CT that are stacked in a direction perpendicular to the substrate 401. The cell transistors CT may include the conductive materials CM1 through CM8, the pillars PL, and the information storing layers 406 provided between the conductive materials CM1 through CM8 and the pillars PL.

The conductive materials CM1 through CM8 operate as gates (or control gates) of the cell transistors CT. For example, the first conductive materials CM1 may form the ground selection transistors GST with the information storing layers 406 and the pillars PL. The first conductive materials CM1 may be connected to each other to form one ground selection line GSL. The second through seventh conductive materials CM2 through CM7 may form first through sixth memory cells MC1 through MC6 with the information storing layers 406 and the pillars PL. The second through seventh conductive materials CM2 through CM7 may form first through sixth word lines WL1 through WL6. The eighth conductive materials CM8 may configure string selection transistors SST with the information storing layers 406 and the pillars PL. The eighth conductive materials CM8 may configure string selection lines SSL.

FIG. 4C is an equivalent circuit diagram of a part of the first block BLK1.

Referring to FIG. 4C, cell strings CS11, CS12, CS21, and CS22 are provided between the bit lines, namely, first and second bit lines BL1 and BL2, and the common source line CSL. The cell strings CS11, CS12, CS21, and CS22 may include a string selection transistor SST connected to a string selection line SSL, a plurality of memory cells MC1 through MC6 connected respectively to a plurality of word lines WL1 through WL6, and a ground selection transistor GST connected to a ground selection line GSL.

The memory cells at the same height are commonly connected to one word line. Therefore, when a voltage is applied to a word line of a certain height, the voltage is applied to all of the cell strings CS11, CS12, CS21, and CS22.

The cell strings CS11, CS12, CS21, and CS22 from different rows may be respectively connected to different string selection lines, namely, first and second string selection lines SSL1 and SSL2. By selecting or not selecting the first and second string selection lines SSL1 and SSL2, the cell strings CS11, CS12, CS21, and CS22 may be selected or not selected in row units.

The cell strings CS11, CS12, CS21, and CS22 are connected to the first and second bit lines BL1 and BL2 by column units. The cell strings CS11 and CS21 are connected between the first bit line BL1 and the common source line CSL, and the cell strings CS12 and CS22 are connected between the second bit line BL2 and the common source line CSL. By selecting or not selecting the first and second bit lines BL1 and BL2, the cell strings CS11, CS12, CS21, and CS22 may be selected or not selected in column units.

In order to write data in the plurality of memory cells MC1 through MC6, an erasing operation is performed so that the memory cells have desired (and/or alternatively predetermined) negative threshold voltages. The erasing operation may be performed by the first to n block units BLK1 through BLKn. After that, a high voltage Vpgm is applied to the word line that is connected to the selected memory cell so as to perform a programming operation on the selected memory cell.

When reading data, a voltage of 0V is applied to a gate of a transistor in the selected memory cell, and a power voltage VCC is applied to gates of transistors in the memory cells that are not selected. Here, due to the power voltage VCC applied to electrodes of the transistors in the memory cells that are not selected, voltage stress occurs in the insulating materials 402a and 402. The voltage stress may generate a read disturb that changes a threshold voltage of a transistor of a memory cell. When reading data from the transistor of the memory cell, wrong data may be read if the threshold voltage has changed due to the read disturb.

In a memory cell array have the 3D structure, memory cell transistors that are not selected are arranged above and below, and left and right sides of a page including the selected memory cell when reading the data. Pages, including the memory cell transistors that are not selected, may include data errors caused by the read disturb. In order to limit (and/or prevent) the data errors, a read disturb check operation may be performed. The read disturb check includes sequential reading operations on all or some pages neighboring the selected memory cell transistor, and thus, a read latency overhead may occur.

According to example embodiments, flash memory controlling methods in connection with a random neighbor selection operation for reducing the read latency overhead according to the flash memory reading operation will be described. Example embodiments may be realized via a program for realizing the flash memory controlling method by using the controller 200 of FIG. 2 or firmware (F/W) in which program has been recorded. The firmware (F/W) may be accessed by the controller 200.

Figure 5:
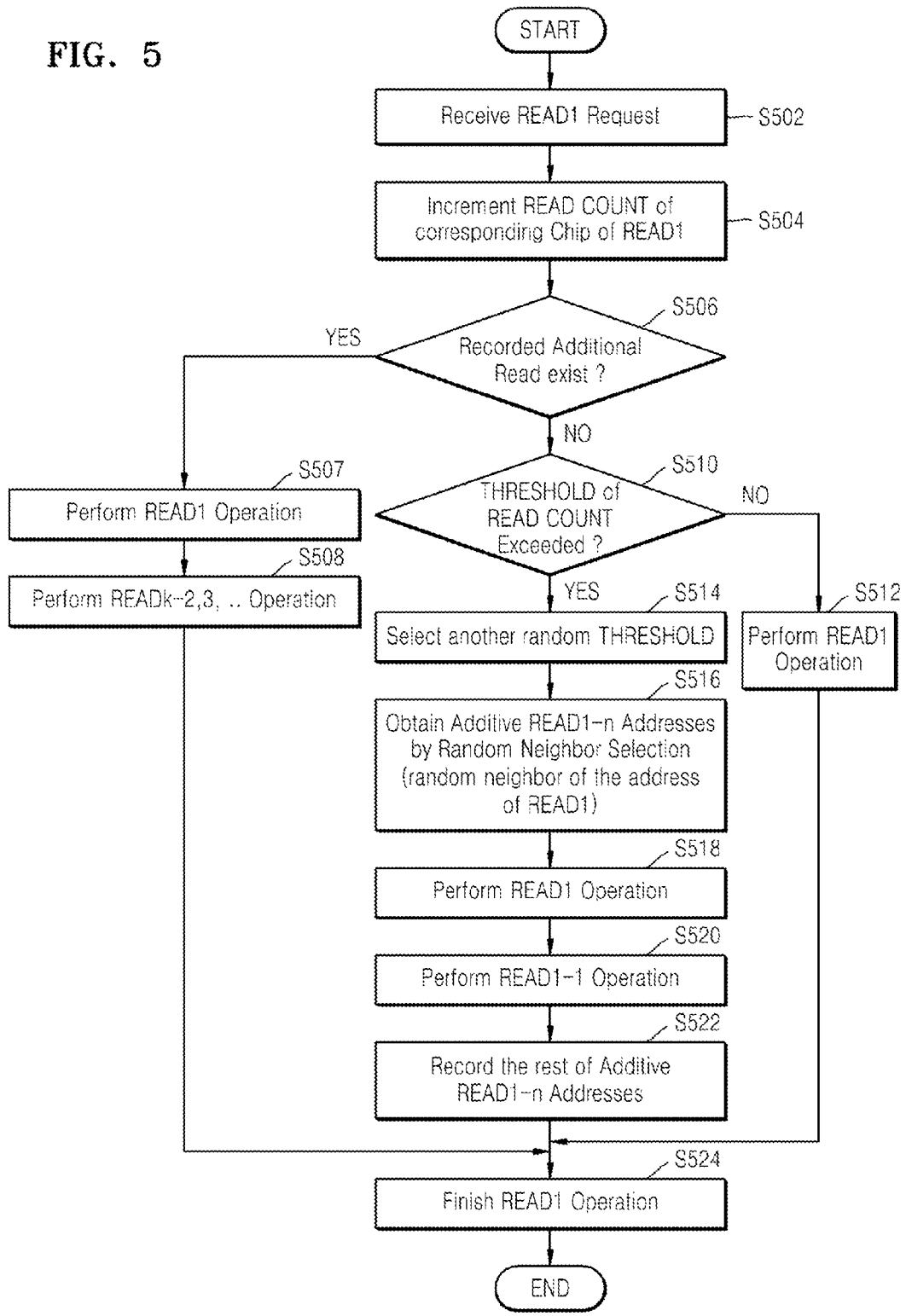
FIG. 5 is a flowchart of a method of controlling a flash memory, according to example embodiments.

FIG. 5 is a flowchart of a flash memory control method according to example embodiments.

In operation S502, the controller 200 receives a first read command READ1 from the host (10 of FIG. 1). The controller 200 may receive a logical address of data that has to be read with the first read command READ1.

Operation S504

The controller 200 converts the logical address of the first read command READ1 into a physical address (e.g., PPA) to determine where the data that has to be read is included from among the flash memory chips 310, . . . , 330. Determining where the data that has to be read may include determining an address of a selected memory cell in a page associated with the read command (e.g., the physical address associated with the logical address of the first read command READ1) among a plurality of pages in the non-volatile memory. A read count of a flash memory chip corresponding to the determined physical address is increased by 1.

Operation S506

The controller 200 determines whether a previous additive reading operation has been recorded. The previous additive reading operation is an additive reading operation that is generated by a random neighbor selection operation according to a read command prior to the first read command. The random neighbor selection operation according to the previous read command randomly selects an address that is different from a physical address of the previous read command. The addresses that are randomly selected to be different from the physical address of the previous read command may be set to address neighboring pages of the page with respect to which the previous read command has be conducted. The neighboring pages on which the additive reading operations will be performed may be recorded in firmware F/W. The firmware (F/W) may be accessed by the controller 200.

Operation S507

Based on the determination result of operation S506, if previous additive reading operations READk-2, 3, . . . have to be performed, the reading operation according to the first read command READ1 is performed. The reading operation according to the first read command READ1 will be performed during a reading time granted to the first read command READ1.

Operation S508

After performing the reading operation according to the first read command READ1 (S507), it may be monitored whether the reading time granted to the first read command READ1 remains. During the remaining reading time, the previous additive reading operations READk-2, 3, . . . may be performed. The number of previous additive reading operations READk-2, 3, . . . that will be performed may be determined according to the remaining reading time. Desired (and/or alternatively predetermined) previous additive reading operations READk-2, 3, . . . are performed during the remaining reading time of the first read command READ1 (S508), and the reading operation according to the first read command READ1 is finished (S524).

Operation S510

Based on the determination result of S506, if there is no previous additive reading operation recorded in the firmware F/W, it is determined whether a read count of the flash memory chip with respect to which the first read command READ1 will be performed exceeds a desired (and/or alternatively predetermined) threshold value (THRESHOLD). The firmware (F/W) may be accessed by the controller 200.

Operation S512

Based on the determination result of S510, if the read count of the flash memory chip does not exceed the desired (and/or alternatively predetermined) threshold value (THRESHOLD), the reading operation according to the first read command READ1 is performed and the reading operation according to the first read command READ1 is finished (S524).

Operation S514

Based on the determination result of S510, otherwise, if the read count of the flash memory chips 310, . . . , or 330 exceeds the desired (and/or alternatively predetermined) threshold value (THRESHOLD), the threshold value of the read count of the corresponding flash memory chip is changed to another value. The changed read count threshold value may be less than the previous threshold value.

Operation S516

In order to perform additive reading operations according to the first read command READ1, addresses that are different from the physical address of the first read command READ1 are randomly generated by the random neighbor selection operation according to the first read command READ1. The addresses to which the additive reading operations READ1-n corresponding to the first read command READ1 will be performed may address neighboring pages of the page with respect to which the first read command READ1 is performed. The neighboring pages may be selected to be adjacent or not to be adjacent to the page with respect to which the first read command READ1 is performed according to the random neighbor selection operation.

Operation S518

The reading operation according to the first read command READ1 is performed.

Operation S520

One additive reading operation READ1-1 from among the additive reading operations READ1-n corresponding to the first read command READ1 is performed.

Operation S522

From among the additive reading operations READ1-n corresponding to the first read command READ1, neighboring pages, on which other additive reading operations READ1-n, except for the additive reading operation READ1-1 that is performed, will be performed, are recorded in the firmware F/W, and then, the reading operation according to the first read command READ1 is finished (S524). The firmware (F/W) may be accessed by the controller 200.

According to a memory control method in example embodiments, the plurality of additive reading operations READ1-n according to the first read command READ1 are dispersed and processed by the first read command READ1. Accordingly, the reading time according to the corresponding first read command READ1 does not exceed the reading time that is regulated by a specification.

Figure 6:
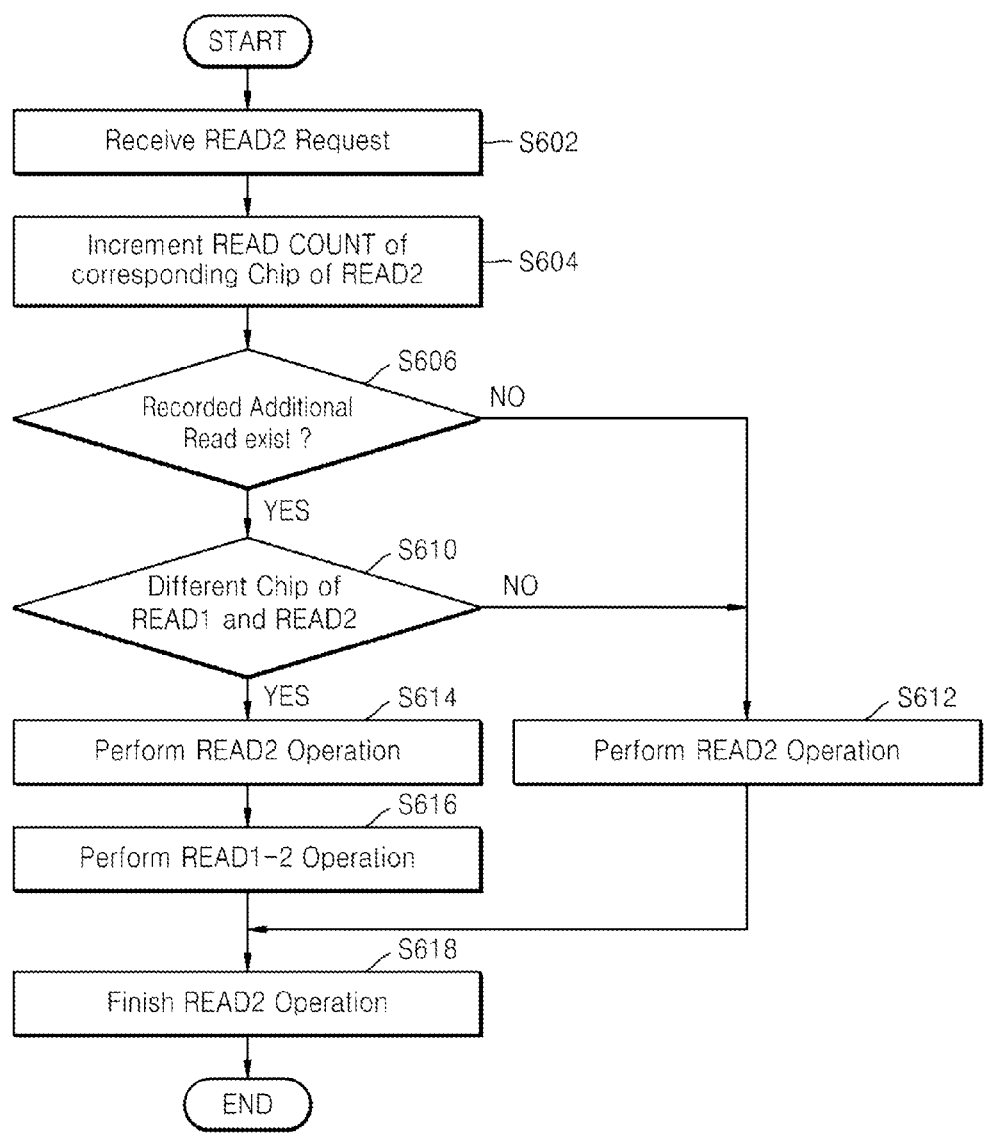
FIG. 6 is a flowchart of a method of controlling a flash memory, according to example embodiments.

FIG. 6 is a flowchart of a flash memory control method according to example embodiments.

Operation S602

The controller 200 receives a second read command READ2 from the host (10 of FIG. 1). The controller 200 may receive a logical address of data that has to be read with the second read command READ2.

Operation S604

The controller 200 converts the logical address of the second read command READ2 into a physical address to determine which flash memory includes data that has to be read. A read count of the flash memory chip corresponding to the determined physical address is increased by 1.

Operations S606 and S610

The controller 200 determines whether the additive reading operations according to the previous read command, for example, the first read command READ1 described with reference to FIG. 5, are recorded (S606). After determining that the additive reading operations are recorded (S606), the controller 200 determines whether the flash memory chip with respect to which the additive reading operation according to the first read command READ1 will be performed and the flash memory chip with respect to which the second read command READ2 will be performed differ (S610).

Operation S612

Based on the determination result of S610, if the flash memory chip with respect to which the additive reading operation according to the first read command READ1 will be performed and the flash memory chip with respect to which the second read command READ2 will be performed are the same as each other, a reading operation according to the second read command READ2 is performed (S612), and then, the reading operation according to the second read command READ2 is finished (S618).

Operations S614 and S616

Based on the determination result of S610, otherwise, if the flash memory chip with respect to which the additive reading operation according to the first read command READ1 will be performed and the flash memory chip with respect to which the second read command READ2 will be performed differ, the reading operation S614 according to the second read command READ2 and the additive reading operation S616 according to the first read command READ1 are performed simultaneously, and the reading operation according to the second read command READ2 is finished (S618).

According to a memory control method in example embodiments, in a case where the first read command READ1 and the second read command READ2 are performed by different memory chips from each other, the plurality of additive reading operations READ1-$n$ corresponding to the first read command READ1 are dispersed so as to be performed after performing the second read command READ2. Accordingly, the reading times according to the first and second read commands READ1 and READ2 do not exceed the time regulated by the specification.

Figure 7:
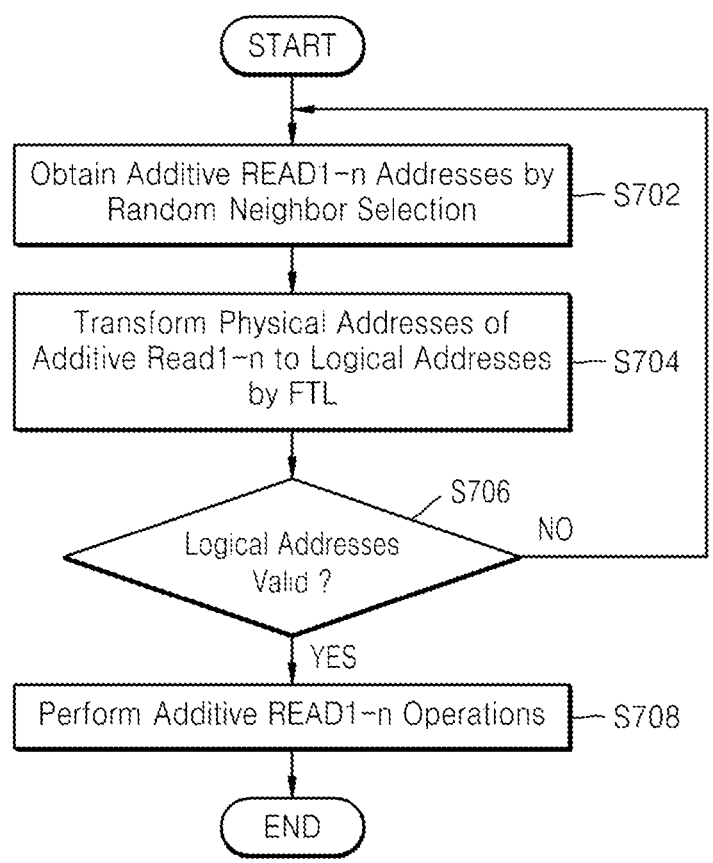
FIG. 7 is a flowchart of a method of controlling a flash memory, according to example embodiments.

FIG. 7 is a flowchart of a flash memory control method according to example embodiments.

Operation S702

As described above with reference to FIG. 5, if the read count of the corresponding flash memory chip 310, . . . , or 330 with respect to which the first read command READ1 will be performed exceeds a desired (and/or alternatively predetermined) threshold value (THRESHOLD), addresses of the additive reading operations READ1-$n$ corresponding to the first read command READ1 are generated. The addresses of the additive reading operations READ1-$n$ are different from the physical address of the first read command READ1 according to the random neighbor selection operation according to the first read command READ1. The addresses to which the additive reading operations READ1-$n$ will be performed may address neighboring pages of the page with respect to which the second read command READ2 is performed. The random neighbor selection operation may select neighboring pages that are adjacent or not adjacent to the page with respect to which the first read command READ1 is performed. The addresses of the neighboring pages on which the additive reading operations READ1-$n$ corresponding to the first read command READ1 will be performed may be recorded in the firmware F/W. The firmware (F/W) may be accessed by the controller 200.

Operation S704

The addresses of the neighboring pages on which the additive reading operations READ1-$n$ corresponding to the first read command READ1 will be performed are physical addresses of the corresponding flash memory chips 310, . . . , or 330 with respect to which the first read command READ1 is performed. The physical addresses are converted into logical addresses by the FTL. The FTL may convert the logical address provided by the processor 210 in the controller (200 of FIG. 2) into the physical address that may be used in the flash memory.

Operation S706

The FTL determines whether a converted logical address is effective. The FTL saves the logical address of the page storing data that is impossible to correct error of the flash memory chips 310, . . . , or 330. The flash memory chips 310, . . . , 330 detect and correct data errors by using encoding and decoding technologies based on error correction codes. The FTL compares the converted logical address with the page address that is impossible to correct errors for to determine whether the converted logical address is effective.

According to the determination result of S706, if the converted logical address is invalid, addresses of the additive reading operations READ1-$n$ corresponding to the first read command READ1 are generated again (S702).

Operation S708

According to the determination result of S706, otherwise, if the converted logical address is effective, the additive reading operations READ1-$n$ corresponding to the first read command READ1 are performed.

According to a memory control method in example embodiments, the FTL determines the effectiveness of the logical addresses of the plurality of additive reading operations READ1-$n$ corresponding to the first read command READ1 in advance, and thus, the random neighbor selection operation may be performed efficiently.

Figure 8:
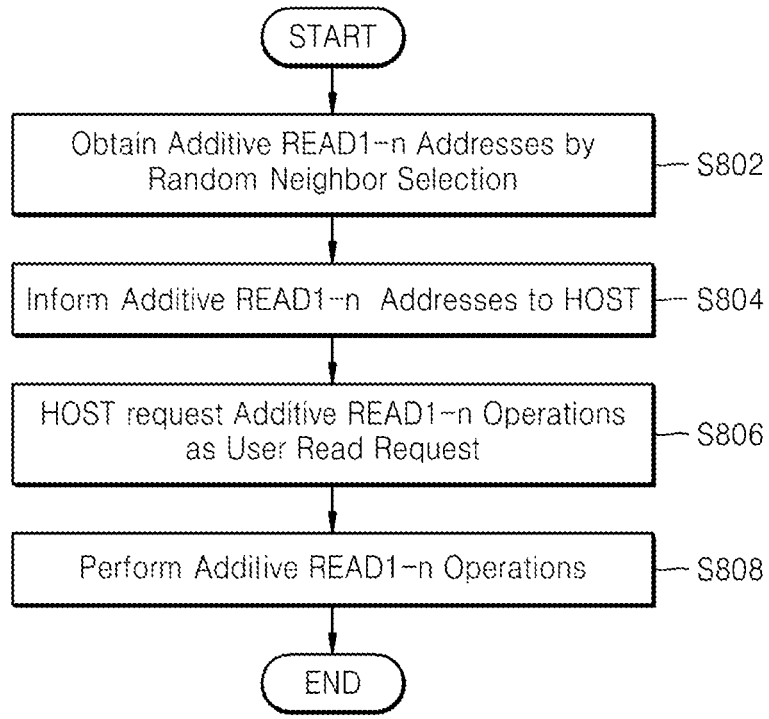
FIG. 8 is a flowchart of a method of controlling a flash memory, according to example embodiments.

FIG. 8 is a flowchart of a flash memory control method according to example embodiments.

Operation S802

As described with reference to FIG. 5, if the read count of the corresponding flash memory chips 310, . . . , or 330 with respect to which the first read command READ1 will be performed exceeds the desired (and/or alternatively predetermined) threshold value (THRESHOLD), addresses of the additive reading operations READ1-$n$ corresponding to the first read command READ1 are generated. The addresses of the additive reading operations READ1-$n$ are different from the physical address of the first read command READ1 according to the random neighbor selection operation according to the first read command READ1. The addresses to which the additive reading operations READ1-$n$ will be performed may address neighboring pages of the page with respect to which the second read command READ2 is performed. The random neighbor selection operation may select neighboring pages that are adjacent or not adjacent to the page with respect to which the first read command READ1 is performed. The addresses of the neighboring pages on which the additive reading operations READ1-$n$ corresponding to the first read command READ1 will be performed may be recorded in the firmware F/W. The firmware (F/W) may be accessed by the controller 200.

Operation S804

The controller (200 of FIG. 2) notifies the host 10 of the addresses of the additive reading operations READ1-$n$ corresponding to the first read command READ1.

Operation S806

The host 10 may request the controller 200 for the additive reading operations READ1-$n$ corresponding to the first read command READ1 as a user reading operation.

Operation S808

The controller 200 performs the additive reading operations READ1-$n$ corresponding to the first read command READ1 that is transmitted from the host 10.

According to a memory control method in example embodiments, the addresses to which the additive reading operations READ1-$n$ corresponding to the first read command READ1 will be performed are transmitted to the host 10. The host 10 performs the plurality of additive reading operations as the user reading operations.

Figure 9:
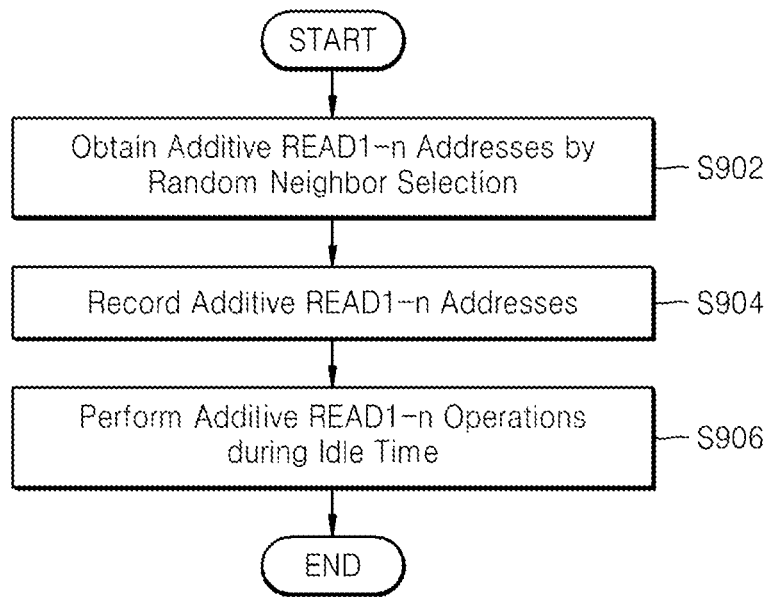
FIG. 9 is a flowchart of a method of controlling a flash memory, according to example embodiments.

FIG. 9 is a flowchart of a flash memory control method according to example embodiments.

Operation S902

As described above with reference to FIG. 5, if the read count of the corresponding flash memory chips 310, . . . , or 330 with respect to which the first read command READ1 will be performed exceeds the desired (and/or alternatively predetermined) threshold value (THRESHOLD), addresses of the additive reading operations READ1-$n$ corresponding to the first read command READ1 are generated. The addresses of the additive reading operations READ1-$n$ are different from the physical address of the first read command READ1 according to the random neighbor selection operation according to the first read command READ1. The addresses to which the additive reading operations READ1-n will be performed may address neighboring pages of the page with respect to which the second read command READ2 is performed. The random neighbor selection operation may select neighboring pages that are adjacent or not adjacent to the page with respect to which the first read command READ1 is performed.

Operation S904

The addresses of the neighboring pages on which the additive reading operations READ1-n corresponding to the first read command READ1 will be performed are recorded in the firmware F/W. The firmware (F/W) may be accessed by the controller 200.

Operation S906

The additive reading operations READ1-n corresponding to the first read command READ1 are performed during an idle time of the memory system (100 of FIG. 2). The idle time denotes a time period in which the processor 210 of the controller 200 does not operate, an I/O interrupt standby time, a sleep status time, or a screen-off time.

According to example embodiments, the plurality of additive reading operations READ1-n corresponding to the first read command READ1 are dispersed and performed during the idle time of the controller 200.

FIG. 10 is a flowchart of a flash memory control method according to example embodiments.

Operation S1002

The controller 200 receives the first read command READ1 from the host (10 of FIG. 1). The controller 200 may receive a logical address of data that has to be read with the first read command READ1.

Operation S1004

The controller 200 converts the logical address of the first read command READ1 into a physical address to determine which flash memory includes data that has to be read. A read count of the flash memory chip corresponding to the determined physical address is increased by 1.

Operation S1006

It is determined whether the read count of the flash memory chip with respect to which the first read command READ1 will be performed exceeds a desired (and/or alternatively predetermined) first threshold value (THRESHOLD1).

Operation S1010

According to the determination result of operation S1006, if the read count of the flash memory chip exceeds the first threshold value THRESHOLD1, the threshold value of the read count of the corresponding flash memory chip is changed to another value. The changed threshold value may be less than the previous threshold value (THRESHOLD1).

Operation S1012

In order to perform additive reading operations READ1A-n according to the first read command READ1, addresses that are different from the physical address of the first read command READ1 are randomly generated according to the random neighbor selection operation of the first read command READ1. The addresses to which the additive reading operations READ1A-n corresponding to the first read command READ1 will be performed may address neighboring pages of the page with respect to which the first read command READ1 is performed.

The neighboring pages selected in the random neighbor selection operation may be randomly selected in a third direction Z that is perpendicular to the substrate (401 of FIG. 4B) with respect to the page with respect to which the first read command READ1 is performed. The neighboring pages that are randomly selected in the third direction Z may be included in the same block as that to which the page with respect to which the first read command READ1 is performed belongs. Also, the neighboring pages may be adjacent to the page with respect to which the first read command READ1 is performed in the first direction X. In this case, the neighboring pages may be included in a block that is different from that to which the page with respect to which the first read command READ1 is performed belongs. That is, the neighboring pages that are selected in the random neighbor selection operation may be in the block to which the page with respect to which the first read command READ1 is performed belongs (or self block) or an adjacent neighboring block.

Operation S1014

The reading operation according to the first read command READ1 is performed.

Operation S1016

One (READ1A-1) of the additive reading operations READ1A-n corresponding to the first read command READ1 is performed.

Operation S1018

The neighboring pages on which the other additive reading operations READ1A-n, except for the additive reading operation READ1A-1 that has been performed will be performed are recorded in the firmware F/W, and the reading operation according to the first read command READ1 is finished (S1040). The firmware (F/W) may be accessed by the controller 200.

Operation S1020

According to the determination result of S1006, it is determined whether the read count of the flash memory chip with respect to which the first read command READ1 will be performed exceeds a desired (and/or alternatively predetermined) second threshold value (THRESHOLD2), while not exceeding the first threshold value (THRESHOLD1). The second threshold value THRESHOLD2 may be smaller than the first threshold value THRESHOLD1.

Operation S1022

According to the determination result of S1020, if the read count of the flash memory chip does not exceed the second threshold value THRESHOLD2, the reading operation according to the first read command READ1 is performed and then, the reading operation according to the first read command READ1 is finished (S1040).

Operation S1030

According to the determination result of S1020, if the read count of the corresponding flash memory chip exceeds the second threshold value THRESHOLD2, the read count threshold value of the corresponding flash memory chip is changed to another value. The changed threshold value may be less than the previous threshold value (THRESHOLD2).

Operation S1032

In order to perform additive reading operations READ1B-n according to the first read command READ1, addresses that are different from the physical address of the first read command READ1 are randomly generated by the random neighbor selection operation according to the first read command READ1. The addresses to which the additive reading operations READ1B-n corresponding to the first read command READ1 will be performed may address neighboring pages of the page with respect to which the first read command READ1 is performed. The neighboring pages that are selected in the random neighbor selection operation may be included in the block to which the page with respect to which the first read command READ1 is performed belongs (or a self block) or an adjacent neighboring block. The addresses obtained in operation S1012 and S1032 may be different from each other.

Operation S1034

The reading operation according to the first read command READ1 is performed.

Operation S1036

One (READ1B-1) of the additive reading operations READ1B-n corresponding to the first read command READ1 is performed.

Operation S1038

The neighboring pages on which the other additive reading operations READ1B-n, except for the additive reading operation READ1B-1 that has been performed, will be performed are recorded in the firmware F/W, and the reading operation according to the first read command READ1 is finished (S1040). The firmware (F/W) may be accessed by the controller 200.

According to a memory control method in example embodiments, the read count threshold value THRESHOLD1 or THRESHOLD2 is changed according to whether the plurality of additive reading operations READ1-n corresponding to the first read command READ1 are performed in the self block that is the same as the block with respect to which the first read command READ1 is performed or in the adjacent neighboring block.

Figure 11A:
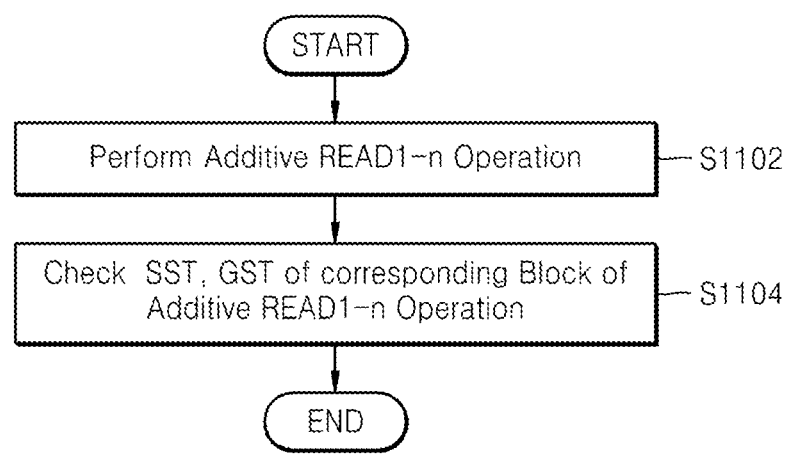
FIGS. 11A and 11B are flowcharts of a method of controlling a flash memory, according to example embodiments.
Figure 11B:
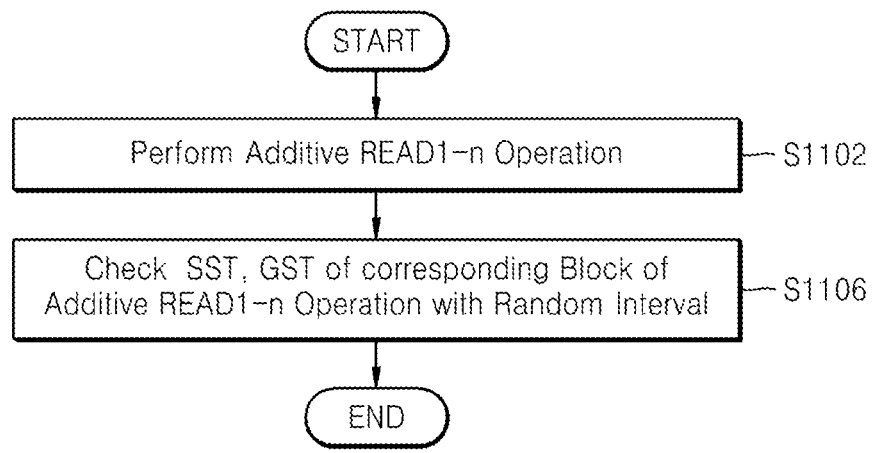

FIGS. 11A and 11B are flowcharts of a flash memory control method according to example embodiments.

Referring to FIG. 11A, additive reading operations READ1-n according to the first read command READ1 are performed (S1102). After that, a string selection transistor SST and a ground selection transistor GST of the block on which the additive reading operations READ1-n are performed are checked (S1104). The block on which the additive reading operations READ1-n is performed may be the self block to which the page performing the first read command READ1 belongs or an adjacent neighboring block.

Referring to FIG. 11B, the additive reading operations READ1-n according to the first read command READ1 are performed (S1102). After that, the string selection transistor SST and the ground selection transistor GST of the block on which one of the additive reading operations READ1-n is performed are checked with a random period (S1106). The block on which one of the additive reading operations READ1-n is performed may be the self block to which the page performing the first read command READ1 belongs or an adjacent neighboring block. The random period may denote a period of checking the string selection transistor SST and the ground selection transistor GST and a period of checking the data of the page performing the additive reading operations READ1-n according to the first read command READ1 are set to be different from each other. The period of checking the data of the page performing the additive reading operations READ1-n according to the first read command READ1 may be set by setting the read count of the corresponding flash memory chip as the first threshold value THRESHOLD1, the second threshold value THRESHOLD2, or changing of the threshold value, as described above with reference to FIG. 10.

According to a memory control method in example embodiments, the states of the string selection transistor SST and the ground selection transistor GST of the block on which the plurality of additive reading operations READ1-n corresponding to the first read command READ1 are performed are checked. The period of checking the states of the string selection transistor SST and the ground selection transistor GST may be set to be different from the period of checking data of the page performing the plurality of additive reading operations READ1-n according to the first read command READ1.

Figure 12:
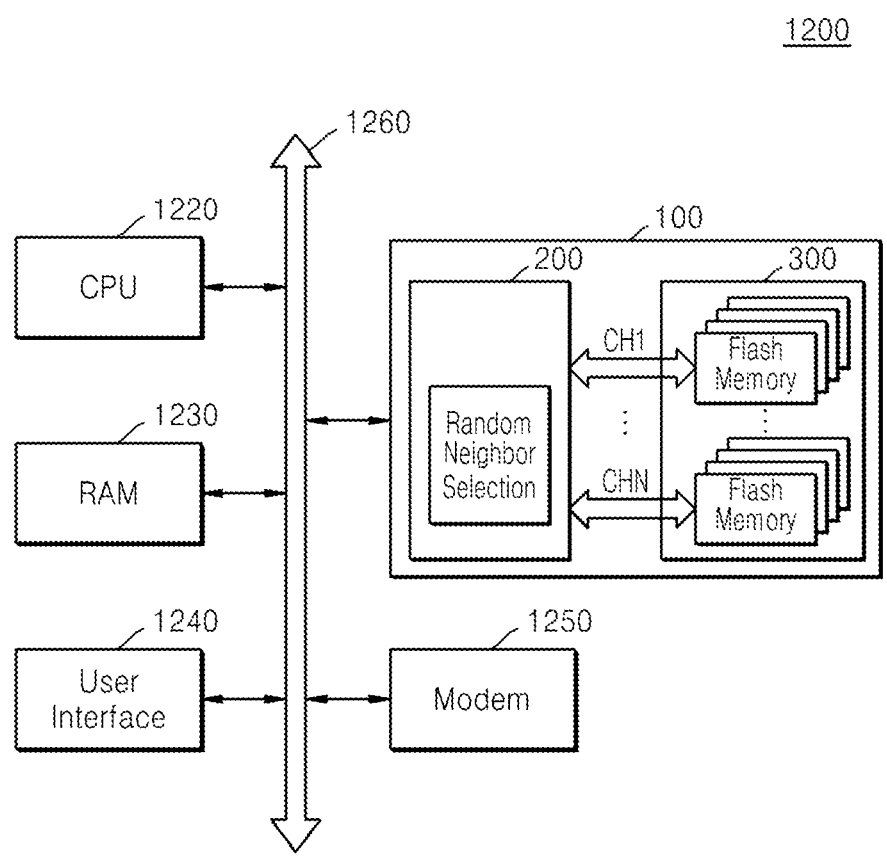
FIG. 12 is a diagram of a computing system adopting a method of controlling a flash memory according to example embodiments.

FIG. 12 is a diagram of a computing system 1200 adopting a flash memory control method according to example embodiments.

Referring to FIG. 12, the computing system 1200 includes a microprocessor 1220, RAM 1230, a user interface 1240, a modem 1250 such as a baseband chipset, and the memory system 100 that are electrically connected to a system bus 1260.

The memory system 100 includes the controller 200 and the flash memory 300. The controller 200 may connect the microprocessor 1220 and the flash memory 300 to each other via the system bus 1260. The controller 200 may provide an interface with the flash memory 300 in correspondence with a bus format of the microprocessor 1220. The memory system 100 may be formed as a solid state disk (SSD). In this case, the controller 200 may be configured to communicate with the outside (for example, a host) via one of various interface protocols such as USB, MMC, PCI-E, SAS, SATA, PATA, SCSI, enhanced small disk interface (ESDI), and IDE.

The controller 200 may be configured in the same manner as the controller 200 shown in FIG. 2. Also, the controller 200 may apply the flash memory control methods according to example embodiments. The flash memory 300 may be configured in the same manner as the flash memory shown in FIG. 3 and FIGS. 4A through 4C.

The controller 200 distributes and processes the plurality of additive reading operations for checking data of neighboring pages of the page on which the reading operation according to the read command from the flash memory 300 is performed, from the read command. The controller 200 may determine the validity of the logical addresses of the plurality of additive reading operations corresponding to the read command in the FTL in advance so as to perform the random neighbor selection operation effectively.

In a case where the computing system 1200 is a mobile device, a battery for supplying an operating voltage of the computing system 1200 may be additionally provided. Also, the computing system 1200 may further include an application chipset, a camera image processor (CIS), or mobile DRAM.

The controller 200 and/or the flash memory 300 according to example embodiments may be mounted by using any kind of package. For example, the controller 200 and/or the flash memory 300 of the inventive concept may be mounted by using a package on package (PoP), ball grid arrays (BGAs), chip scale packages (CSPs), a plastic leaded chip carrier (PLCC), a plastic dual in-line package (PDIP), a die in waffle pack, a die in wafer form, a chip on board (COB), a ceramic dual in-line package (CERDIP), a plastic metric quad flat pack (MQFP), a thin quad flat pack (TQFP), a small outline integrated chip (SOIC), a shrink small outline package (SSOP), a thin small outline package (TSOP), a thin quad flat pack (TQFP), a system in package (SIP), a multichip package (MCP), a wafer-level fabricated package (WFP), or a wafer-level processed stack package (WSP).

Example embodiments may not only realized via apparatuses or methods, but may be realized as a program implementing functions corresponding to configuration of example embodiments of inventive concepts or a recording medium in which the program has been recorded. Such an implementation may be obvious to one of ordinary skill in the art from the description of example embodiments.

Figure 13:
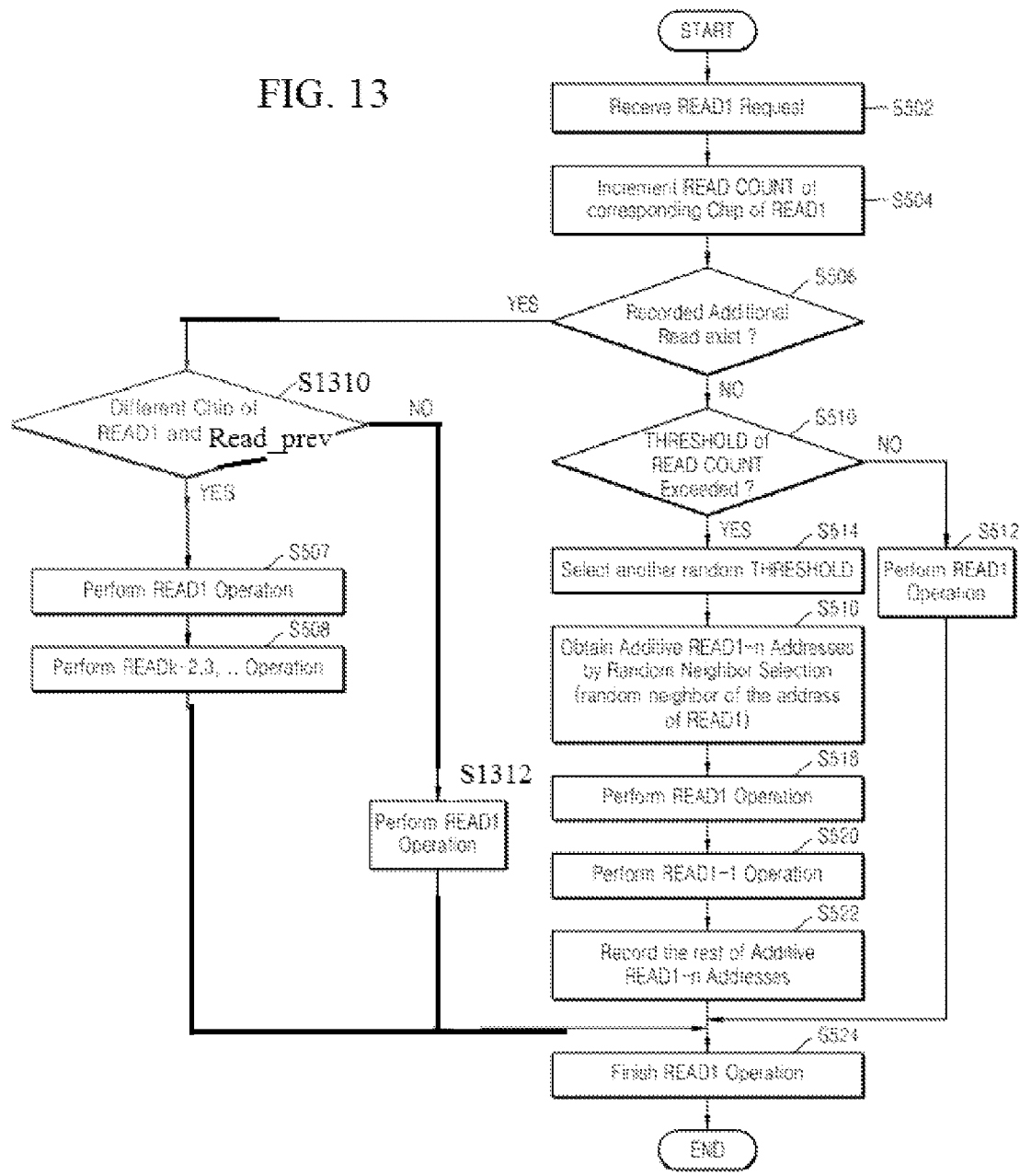
FIG. 13 is a flowchart of a method of controlling a flash memory, according to example embodiments

FIG. 13 is a flowchart of a method of controlling a flash memory, according to example embodiments.

Referring to FIG. 13, the method in FIG. 13 is similar to the method described previously with reference to FIG. 5, except for the operations if the answer is YES in operation S506. Accordingly, only the differences between FIGS. 5 and 13 will be described.

Referring to FIG. 13, if the answer is YES in operation S506, the controller determines if the previously recorded additive reading operations Readk-2,3 associated with a previous read operation Read_prev will be performed on a chip that is different than the chip that the first read operation Read1 will be performed (S1310).

If the result from operation S1310 is NO, then the controller 200 performs operations S507 and S508 the same way as discussed in the method previously described with reference to FIG. 5 of the present application. Then, the reading operation according to the first read command READ1 is finished (S528).

On the other hand, if the result from operation S1310 is YES, then the controller 200 performs the first read operation Read1 (S1312). Then, the reading operation according to the first read command READ1 is finished (S528).

It should be understood that example embodiments described herein should be considered in a descriptive sense only and not for purposes of limitation. Descriptions of features or aspects within each device or method according to example embodiments should typically be considered as available for other similar features or aspects in other devices or methods according to example embodiments. While some example embodiments have been particularly shown and described, it will be understood by one of ordinary skill in the art that variations in form and detail may be made therein without departing from the spirit and scope of the claims.

What is claimed is:

1. A method of controlling a memory system using a controller, the method comprising:
   receiving a first read command;
   determining whether a record exists that indicates previous additive reading operations have been recorded and have not been performed yet, the previous additive reading operations corresponding to addresses of pages that neighbor a page associated with a previous read operation performed among a plurality of pages, the plurality of pages being included in a non-volatile memory in the memory system;
   determining if a read count of the non-volatile memory exceeds a threshold value, in response to the record not existing;
   in response to the read count of the non-volatile memory exceeding the threshold value, and the record does not existing, selecting addresses to which a plurality of additive reading operations corresponding to the first read command will be performed, in a random neighbor selection operation;
   performing a first reading operation on the non-volatile memory according to the first read command; and
   distributing the plurality of additive reading operations to check data of neighboring pages of a page on which the first reading operation has been performed.

2. The method of claim 1, wherein the distributing of the plurality of additive reading operations includes:
   performing one of the plurality of additive reading operations after the first reading operation; and
   storing addresses for remaining ones of the plurality of additive reading operations, except for the one of the plurality of additive reading operations that has been performed, using the controller.

3. The method of claim 1, further comprising:
   in response to the read count of the non-volatile memory exceeding the threshold value, and the record not existing, changing the threshold value.

4. The method of claim 1, further comprising:
   receiving a second read command;
   determining whether the additive reading operations according to the first read command are associated with a chip in the non-volatile memory that is different than a chip in the non-volatile memory associated with the second read command; and
   simultaneously performing the additive reading operations according to the first read command and a second reading operation according to the second read command in response to the additive reading operations according to the first read command and the second read command being associated with different chips in the non-volatile memory.

5. The method of claim 1, further comprising:
   converting addresses of the plurality of additive reading operations corresponding to the first read command into logical addresses by using a flash translation layer (FTL);
   determining whether the logical addresses that are converted by the FTL are valid; and
   in response to the logical addresses not being valid, selecting other addresses of the additive reading operations corresponding to the first read command in the random neighbor selection operation.

6. The method of claim 1, wherein the distributed additive reading operations are performed during an idle time of the controller.

7. The method of claim 1, wherein
   the addresses of the plurality of additive reading operations corresponding to the first read command, which are selected in the random neighbor selection operation, are included in one of a self block and an adjacent neighboring block of the non-volatile memory, and
   an address of a selected memory cell read during the first read command is in the self block of the non-volatile memory.

8. The method of claim 7, further comprising:
   checking states of a string selection transistor and a ground selection transistor in the one of the self block and the adjacent neighboring block of the non-volatile memory on which the plurality of additive reading operations corresponding to the first read command are performed.

9. The method of claim 1, wherein at least one of the non-volatile memory comprises a three-dimensional memory array.

10. The method of claim 9, wherein the three-dimensional memory is monolithically formed in one or more physical levels of memory cells having active areas disposed above a silicon substrate.

11. The method of claim 9, wherein the three dimensional memory array comprises a plurality of memory cells, each of the memory cells including a charge trap layer.

12. The method of claim 9, wherein at least one of word lines and bit lines in the three-dimensional memory array are shared between levels.

13. A method of controlling a memory system using a controller, the method comprising:

receiving a read command;
determining whether a record exists that indicates previous additive reading operations have been recorded and have not been performed yet, the previous additive reading operations corresponding to addresses of pages that neighbor a page associated with a previous read operation performed among a plurality of pages, the plurality of pages included in a non-volatile memory in the memory system;
in response to the record not existing, determining if a read count of the non-volatile memory exceeds a threshold value;
in response to the read count of the non-volatile memory exceeding the threshold value, and the record not existing, selecting addresses to which a plurality of additive reading operations corresponding to the read command in a random neighbor selection operation for checking data of a neighboring page of a page on which a reading operation according to the read command would be performed;
transmitting the addresses for performing the plurality of additive reading operations corresponding to the read command to a host;
performing the reading operation according to the read command; and
performing the plurality of additive reading operations as user reading operations by the host.

14. The method of claim 13, further comprising;
changing the threshold value of the read count in response to the read count of the non-volatile memory for performing the read command exceeding the threshold value and the record not existing.

15. The method of claim 13, further comprising:
checking states of a string selection transistor and a ground selection transistor in a block of the non-volatile memory on which the plurality of additive reading operations corresponding to the read command are performed.

16. A method of controlling a memory system using a controller, the method comprising:
receiving a first read command;
determining an address of a selected memory cell associated with the first read command, the selected memory cell being in a selected page among a plurality of pages in a non-volatile memory of the memory system, each page including a plurality of memory cells;
determining whether a record exists that indicates previous additive reading operations have been recorded and have not been performed yet, the previous additive reading operations corresponding to addresses of pages that neighbor a page associated with a previous read operation performed among the plurality of pages;
performing a first reading operation on the selected page according to the first read command;
distributing remaining ones of the previous additive reading operations, in response to the record not existing, by performing at least one of the remaining ones of the previous additive reading operations before the first reading operation is finished in order to check data of one of the pages that neighbor the page associated with the previous read operation;
determining whether a read count of the non-volatile memory exceeds a threshold value, in response to the record does not existing, before the performing the first reading operation; and
generating and distributing additive reading operations associated with the first reading operation, in response to the record not existing and in response to the read count exceeding the threshold value, by performing a random neighbor generation operation to generate addresses for the additive reading operations associated with the first reading operation to check data on pages that neighbor the selected page among the plurality of pages,
checking data on one of the pages that neighbors the selected page by performing one of the additive reading operations associated with the first reading operation before the first reading operation is finished, and checking data on at least one other page that neighbors the selected page associated with the first reading operation by performing at least one other one of the additive reading operations associated with the first reading operation after the first reading operation is finished.

17. The method of claim 16, wherein the generating and distributing additive reading operations associated with the first reading operation further includes:
storing the additive reading operations associated with the first reading operation, except for the one of the additive reading operations associated with the first reading operation that is performed before the first reading operation is finished, in firmware after the checking data on the one of the pages that neighbors the selected page.

18. The method of claim 16, further comprising:
changing the threshold value in response to the record not existing and the determining whether the read count of the non-volatile memory exceeds the threshold value indicating the read count exceeds the threshold value.

19. The method of claim 16, further comprising:
incrementing the read count of the non-volatile memory after the receiving the first read command and before the first reading operation is finished.

20. The method of claim 16, wherein
the non-volatile memory includes a plurality of strings extending vertically on a substrate, and
each one of the plurality of strings includes a number of the plurality of memory cells stacked on top of each other between a ground select transistor and a string select transistor.

* * * * *